(12) United States Patent
Abe

(10) Patent No.: US 6,605,941 B2
(45) Date of Patent: Aug. 12, 2003

(54) METHOD AND APPARATUS FOR MEASURING CHARACTERISTIC OF SPECIMEN AND ITS APPLICATION TO HIGH FREQUENCY RESPONSE MEASUREMENT WITH SCANNING PROBE MICROSCOPES

(75) Inventor: Masayuki Abe, Fuchu (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 2 days.

(21) Appl. No.: 09/811,771

(22) Filed: Mar. 20, 2001

(65) Prior Publication Data

US 2001/0038282 A1 Nov. 8, 2001

(30) Foreign Application Priority Data

Mar. 23, 2000 (JP) ........................................ 2000-082590

(51) Int. Cl.[7] .............................................. G01R 33/12
(52) U.S. Cl. ........................ 324/244; 324/210; 73/105
(58) Field of Search ................... 324/210, 211, 324/244, 259, 260, 261, 263; 73/105; 360/31

(56) References Cited

U.S. PATENT DOCUMENTS 5,918,274 A * 6/1999 Chen et al. .................... 73/105
6,006,593 A * 12/1999 Yamanaka .................... 73/105
6,094,971 A * 8/2000 Edwards et al. ............... 73/105
6,121,771 A * 9/2000 Moser ......................... 324/244

OTHER PUBLICATIONS

"Measuring the Gigahertz Response of Recording Heads with the Magnetic Force Microscope", Applied Physics Letters, vol. 74, No. 9 pp. 1308–1310, Mar. 1, 1999.
"Techniques for Analysis of Magnetic Recording Heads and Magnetoresistive Heads", H. Ohmori, Sony Corporation, vol. 23, No. 12, pp. 2111–2117.
"Magnetic Force Microscopy of Recording Heads", IEEE Transactions on Magnetics, vol. 27, No. 6, Nov. 1991.

* cited by examiner

Primary Examiner—Edward Lefkowitz
Assistant Examiner—Reena Aurora
(74) Attorney, Agent, or Firm—Pillsbury Winthrop LLP

(57) ABSTRACT

An apparatus for measuring a characteristic of a specimen, includes a probe for scanning a surface of the specimen in a noncontacting state, a vibrating unit for vibrating the probe, an excitation field generating unit for generating an amplitude modulation signal which is amplitude-modulated with a modulation frequency and a carrier frequency and producing an excitation field at the surface of the specimen on the basis of the generated amplitude modulation signal, and a measuring unit for measuring a force interaction between the probe and the specimen caused by the excitation field generated at the surface of the specimen.

26 Claims, 15 Drawing Sheets

FIG. 2A

| SPECIMEN TO BE MEASURED | EXCITATION FIELD | PROBE | INTERACTION TO BE MEASURED | DESCRIPTION (OF EXCITATION FIELD GENERATING METHOD AND OTHERS) |
|---|---|---|---|---|
| CONDUCTOR (OR CONDUCTIVE SEMICONDUCTOR) | ELECTRO-STATIC FIELD | CONDUCTOR OR DOPED SEMICONDUCTOR PROBE WITH HIGH CONDUCTIVITY, PROBE FORMED BY CAUSING CONDUCTOR OR HIGHLY CONDUCTIVE SEMICONDUCTOR OR NON-CONDUCTIVE SEMICONDUCTOR ADHERED TO INSULATOR. | ELECTRO-STATIC FORCE | AMPLITUDE-MODULATED VOLTAGE IS APPLIED TO SPECIMEN TO BE MEASURED. PROBE IS GROUNDED. (AMPLITUDE-MODULATED VOLTAGE MAY BE APPLIED TO PROBE AND THE SPECIMEN BE GROUNDED). |
| INSULATOR (OR NONCONDUCTIVE SEMICONDUCTOR) | ELECTRO-STATIC FIELD | CONDUCTOR OR DOPED SEMICONDUCTOR PROBE WITH HIGH CONDUCTIVITY, PROBE FORMED BY CAUSING CONDUCTOR OR HIGHLY CONDUCTIVE SEMICONDUCTOR OR NON-CONDUCTIVE SEMICONDUCTOR ADHERED TO INSULATOR. | ELECTRO-STATIC FORCE | ELECTRODE IS PROVIDED ON THE BACK OF SPECIMEN TO BE MEASURED AND AMPLITUDE-MODULATED VOLTAGE IS APPLIED TO THE ELECTRODE. PROBE IS GROUNDED. IT IS DESIRABLE THAT THICKNESS OF THE SPECIMEN SHOULD BE AS THIN AS POSSIBLE. (AMPLITUDE-MODULATED VOLTAGE MAY BE APPLIED TO PROBE AND ELECTRODE BE GROUNDED). |
| CONDUCTIVE THIN-FILM WIRE | MAGNETIC FIELD | PROBE FORMED BY MAGNETIC SUBSTANCE OR PROBE FORMED BY CAUSING MAGNETIC THIN FILM ADHERED TO NONMAGNETIC SUBSTANCE. | MAGNETIC FORCE | USED TO MEASURE THE VALUE OF CURRENT FLOWING THROUGH A THIN SIGNAL LINE, SUCH AS SEMICONDUCTOR DEVICE, (AS NANOCURRENT PROBE) OR TO MAKE ANALYSIS OF RADIENT MAGNETIC NOISE (AS NANO EMI). AMPLITUDE-MODULATED CURRENT IS APPLIED TO SIGNAL LINE. |

FIG. 2B

| SPECIMEN TO BE MEASURED | EXCITATION FIELD | PROBE | INTERACTION TO BE MEASURED | DESCRIPTION (OF EXCITATION FIELD GENERATING METHOD AND OTHERS) |
|---|---|---|---|---|
| MAGNETIC HEAD | MAGNETIC FIELD | PROBE FORMED BY MAGNETIC SUBSTANCE OR PROBE FORMED BY CAUSING MAGNETIC THIN FILM ADHERED TO NONMAGNETIC SUBSTANCE. | MAGNETIC FORCE | AMPLITUDE-MODULATED CURRENT IS APPLIED TO A MAGNETIC WRITE HEAD. |
| MAGNETIC SUBSTANCE | MAGNETIC FIELD | PROBE FORMED BY MAGNETIC SUBSTANCE OR PROBE FORMED BY CAUSING MAGNETIC THIN FILM ADHERED TO NONMAGNETIC SUBSTANCE. | MAGNETIC FORCE | AMPLITUDE-MODULATED MAGNETIC FIELD IS EXTERNALLY APPLIED TO MAGNETIC SPECIMEN |
| ARBITRARY SPECIMEN | OPTICAL NEAR FIELD | DOPED CONDUCTIVE SEMICONDUCTOR PROBE | ELECTRO-STATIC FORCE | THIN FILM AS SPECIMEN IS APPLIED TO OR CAUSED TO ADHERE ONTO PRISM. AMPLITUDE-MODULATED LIGHT (LASER) IS TOTALLY REFLECTED AT THE SURFACE OF PRISM, THEREBY CAUSING OPTICAL NEAR FIELD TO BE DEVELOPED AT SPECIMEN. TO IMPROVE SENSITIVITY, ELECTRODE MAY BE PROVIDED ON THE BACK OF PRISM TO WHICH VOLTAGE IS APPLIED. |
| ARBITRARY SPECIMEN | ACOUSTIC WAVE | CONDUCTOR OR DOPED SEMI-CONDUCTOR PROBE WITH HIGH CONDUCTIVITY, PROBE FORMED BY CAUSING CONDUCTOR OR HIGHLY CONDUCTIVE SEMICONDUCTOR OR NON-CONDUCTIVE SEMI-CONDUCTOR ADHERED TO INSULATOR. | ACOUSTO-ELECTRIC (ELECTRO-STATIC) FIELD | PIEZOELECTRIC TRANSDUCER IS PROVIDED ON THE BACK OR SIDE OF SPECIMEN. AMPLITUDE-MODULATED VOLTAGE IS APPLIED TO PIEZO-ELECTRIC TRANSDUCER, THEREBY CAUSING ACOUSTIC WAVE TO BE DEVELOPED AT THE SURFACE OF SPECIMEN |

FIG. 5A
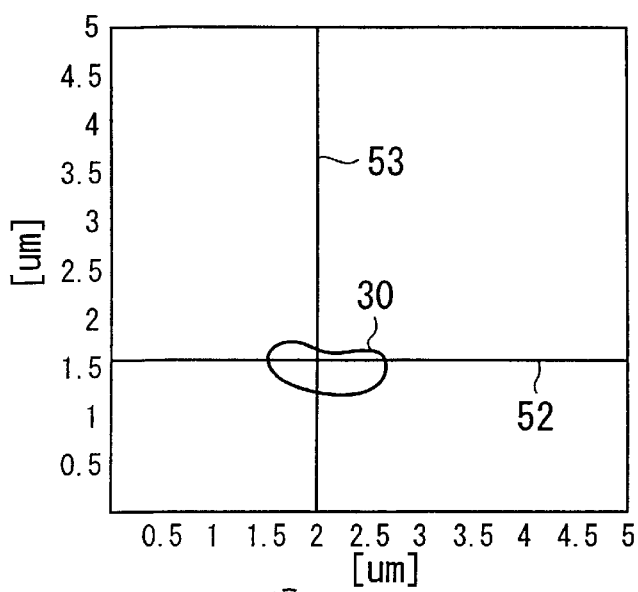
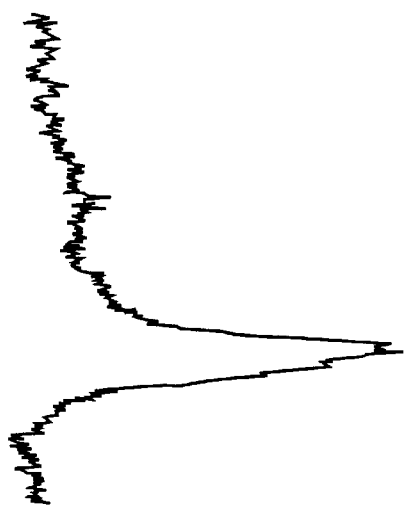
FIG. 5B
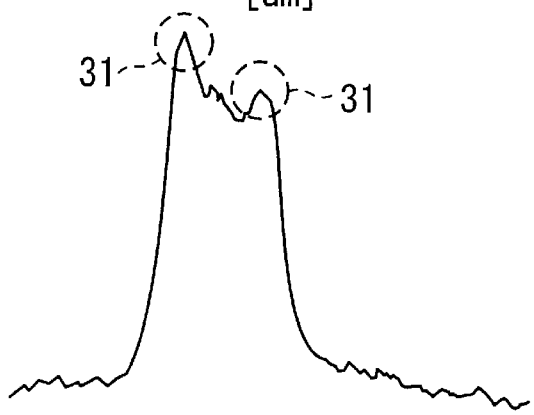
FIG. 5C

METHOD AND APPARATUS FOR MEASURING CHARACTERISTIC OF SPECIMEN AND ITS APPLICATION TO HIGH FREQUENCY RESPONSE MEASUREMENT WITH SCANNING PROBE MICROSCOPES

CROSS-REFERENCE TO RELATED APPLICATIONS

This application is based on and claims the priority from the prior Japanese Patent Application No. 2000-082590, filed Mar. 23, 2000; Application No. 2001-065247, filed Mar. 8, 2001; and Application No. 2001-085820, filed Mar. 23, 2001, the entire contents of which are incorporated herein by reference.

BACKGROUND OF THE INVENTION

The present invention relates to a method and apparatus for measuring a characteristic of a specimen of a magnetic head and its application to high frequency response measurement with the scanning probe microscopes.

In the process of manufacturing magnetic recording heads used in, for example, hard disk drives, a dedicated magnetic recording head measuring apparatus using a magnetic force microscope (MFM) has been used to measure the distribution of the magnetic field of a head and its magnetic force. The MFM, which is a kind of scanning probe microscope, normally brings a probe provided on a cantilever close to a magnetic recording head as a specimen to be measured, and senses the magnetic force interaction (force or force gradient) caused by the magnetic field generated from the head in a noncontacting manner.

The magnetic recording head is, for example, an inductive thin-film head and has a magnetic gap that generates a recording magnetic field according to a signal current applied to a coil. The magnetic recording head measuring apparatus applies a high-frequency signal current to (the coil of) the head as a specimen, and measures the distribution of the magnetic field generated from the magnetic gap. One known measuring method is to sense the phase or displacement of the vibrating cantilever (i.e., the magnetic force interaction caused by the magnetic field of the head) and measure the force gradient or force between the probe and the specimen on the basis of the result of the sensing. The phase shift of the cantilever approximates the force gradient and the displacement of the cantilever approximates the force.

As described above, the magnetic recording head measuring apparatus using an MFM measures the force or force gradient between the head and the probe when causing the head to generate a magnetic field, thereby measuring the magnetic force of the head. The frequency of the signal current to cause the head to generate a magnetic field in measurement is high (for example, several tens of MHz), which is much higher than the resonance frequency of the cantilever that determines the response speed of the measurement. For this reason, it is difficult to measure the magnetic force of the head with a high sensitivity and a high resolution by extracting only the high-frequency response in measuring the magnetic force of the head on the basis of the resonance frequency component of the cantilever.

Another known measuring method is to apply a high-frequency sinusoidal wave to the head and measure the DC components of the phase shift (corresponding to force gradient) of the cantilever caused by the magnetic field generated from the head. Since the measured DC components include the components other than the high-frequency components, it is difficult to interpret the measured data. In addition, a known force measuring method of measuring the force from the displacement of the cantilever has the problems of relatively low resolution and variations in the distance between the probe and the specimen in places with the strong and weak magnetic fields.

In the meantime, H. Yokoyama and T. Inoue, Thin Solid Films 242 (1994) 33 disclose a technique of applying an amplitude-modulated voltage with a modulation frequency and a carrier frequency to a specimen and measuring an electrostatic force interaction of a high frequency component between the probe and the specimen. R. Proksch and P. Neilson, S. Austvold and J. J. Schmidt, Applied Physics Letters 74 (1999) 1308. (Digital Instruments et al.) also disclose a similar technique.

However, in these documents, an interaction between the probe and the specimen caused by the excitation field generated at the surface of the specimen is detected as a displacement (vibration amplitude) of the cantilever, so that the interaction is small when the excitation field is weak and the interaction is large when the excitation field is strong. As a result, it is difficult to obtain an image to which the distribution of the excitation field is precisely reflected.

Furthermore, in these documents, the displacement of the cantilever is determined by the intensity of the interaction, so that a back portion of the probe is particularly influenced by the interaction. As a result, it is difficult to obtain a high spatial resolution in the measurement.

In addition, a conventional measuring method is mainly for the spatial distribution of the magnetic field of a magnetic recording head and is unsuitable for measuring the frequency characteristic of a high-frequency magnetic field in a state where the magnetic recording head is actually incorporated in an HDD. The reason is the difference in signal applying method between a signal generator and a head amplifier for driving the magnetic recording head. The signal generator is normally operated at a constant voltage, whereas the actual head amplifier is operated at a constant current (although the voltage and the current might not be constant at high frequencies because of the frequency characteristic). Since the impedance of the circuit meter varies at high frequencies, the frequency characteristic in a state similar to a case where the magnetic recording head is incorporated in an HDD cannot be measured. In addition, since the actual head amplifier operates digitally, it is difficult to incorporate the head amplifier in a conventional magnetic recording head measuring apparatus.

BRIEF SUMMARY OF THE INVENTION

Accordingly, it is an object of the present invention to provide a method and apparatus for measuring a characteristic of a specimen, which realize high-frequency response and measurement with a high sensitivity and a high resolution.

It is another object of the present invention to provide a method and apparatus capable of measuring a frequency characteristic of the magnetic field generated from a magnetic head in an environment almost similar to a state where the magnetic recording head is incorporated in an HDD.

According to one aspect of the present invention, there is provided an apparatus for measuring a characteristic of a specimen, comprising: a probe for scanning a surface of the specimen in a noncontacting state; vibrating means for vibrating the probe; excitation field generating means for generating an amplitude modulation signal which is amplitude-modulated with a modulation frequency and a carrier frequency and producing an excitation field at the surface of the specimen on the basis of the generated amplitude modulation signal; and measuring means for measuring a change in a vibration frequency of the probe according to the excitation field generated at the surface of the specimen.

According to another aspect of the present invention, there is provided an apparatus for measuring a characteristic of a specimen, comprising: a probe for scanning a surface of the specimen in a noncontacting state; vibrating means for vibrating the probe; excitation field generating means for generating an amplitude modulation signal which is amplitude-modulated with a modulation frequency and a carrier frequency and producing an excitation field at the surface of the specimen on the basis of the generated amplitude modulation signal; and measuring means for measuring a force gradient induced to the probe by the excitation field generated at the surface of the specimen.

According to still another aspect of the present invention, there is provided an apparatus for measuring a characteristic of a magnetic recording head, comprising: a probe for scanning a surface of the magnetic recording head in a noncontacting state; vibrating means for vibrating the probe; current generating means for generating an amplitude modulation current and applying the generated current to the magnetic recording head; and measuring means for measuring a force gradient induced to the probe by the magnetic field generated at the surface of the magnetic recording head according to the application of the amplitude modulation current.

According to still another aspect of the present invention, there is provided an apparatus for measuring a characteristic of a magnetic recording head, comprising: a probe for scanning a surface of the magnetic recording head in a noncontacting state; vibrating means for vibrating the probe; signal generating means for generating an amplitude modulation signal on the basis of a carrier frequency and varying a value of the amplitude modulation signal by changing a value of the carrier frequency; a head amplifier equivalent circuit for generating an amplitude modulation current to cause the magnetic recording head to operate on the basis of the amplitude modulation signal and applying the generated current to the magnetic recording head, the head amplifier equivalent circuit having an electrical characteristic equivalent to an actual head driving amplifier; phase shift measuring means for measuring a phase shift of a vibration of the probe according to the magnetic field generated by the magnetic recording head; and magnetic field frequency dependence measuring means for measuring a change in a value of the phase shift with respect to a change in the value of the amplitude modulation signal caused by the signal generating means as a magnetic field frequency dependence of the magnetic recording head.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A and 2B are a table listing examples of measurement other than that in the first embodiment;

FIGS. 5A to 5C are diagrams showing an example of measuring a force gradient image in the second embodiment;

DETAILED DESCRIPTION OF THE INVENTION

Hereinafter, referring to the accompanying drawings, embodiments of the present invention will be explained.

First Embodiment

Figure 1:
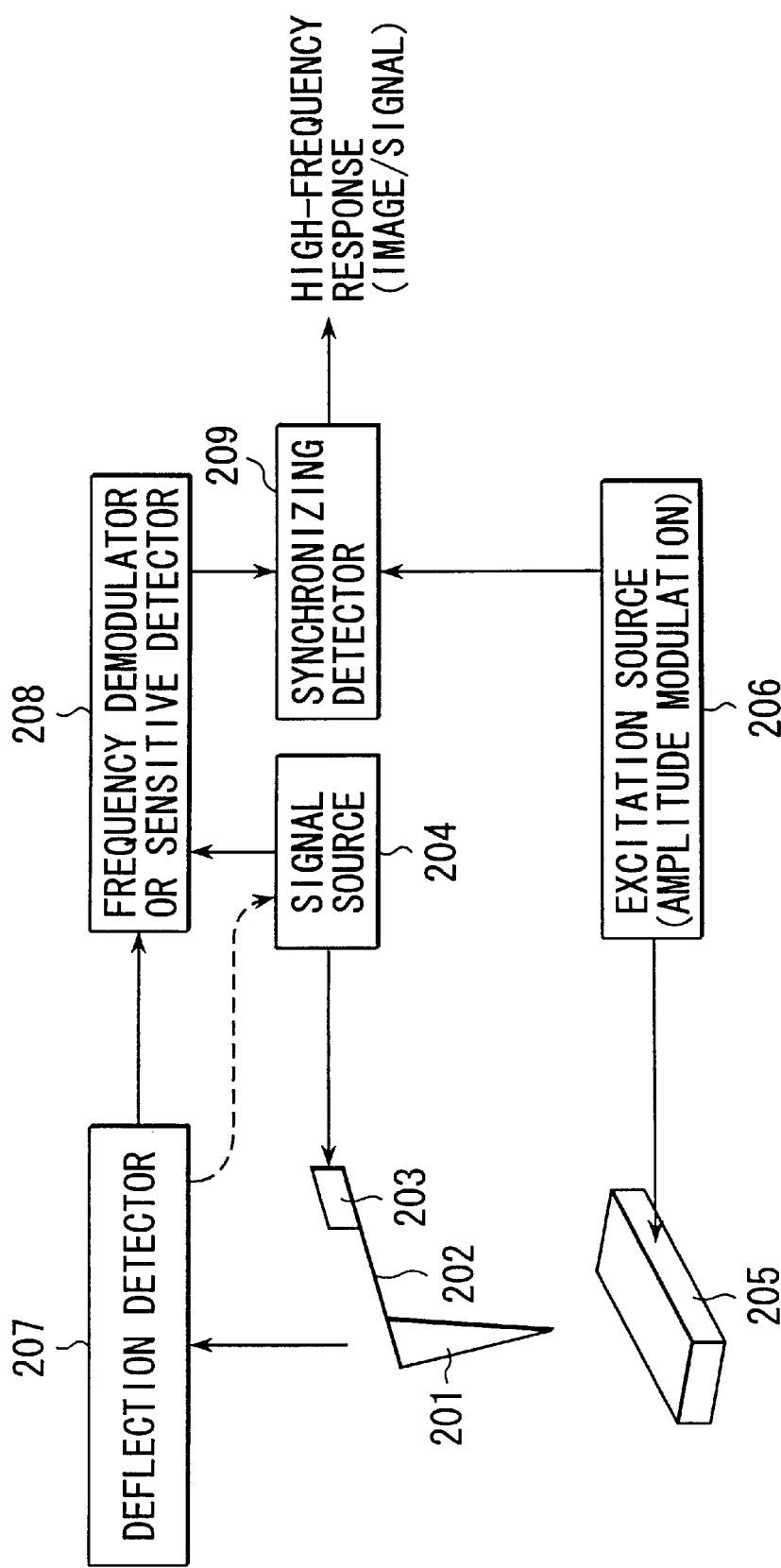
FIG. 1 is a block diagram showing the main part of a specimen measuring apparatus according to a first embodiment of the present invention.

A first embodiment of the present invention will be explained.
(Configuration of Specimen Measuring Apparatus)
FIG. 1 is a block diagram showing the main part of a specimen measuring apparatus according to a first embodiment of the present invention.

The measuring apparatus according to the first embodiment, which uses a high-frequency scanning probe microscope, includes a probe 201 for measuring force interaction, a cantilever 202 for supporting the probe end 201, an actuating piezoelectric element 203 which supports the cantilever 202 and vibrates the probe 201 and cantilever 202, a signal source 204 for applying a signal to the actuating piezoelectric element 203 (to vibrate the cantilever 202 at a vibration frequency which is the resonance frequency $\omega r$ or a frequency near the resonance frequency), a specimen 205 to be measured, an excitation source 206 for generating an excitation field at the surface on the specimen 205, a deflection detector 207 for sensing the displacement of the cantilever 202, a frequency demodulator or phase sensitive detector 208 for measuring the frequency shift or phase shift of the cantilever 202 from the output signal of the deflection detector 207, and a synchronizing detector 209 for detecting the component synchronizing with the modulation frequency of the excitation source 206 from the output of the frequency demodulator or phase sensitive detector 208.

In the configuration, the excitation source 206 generates an amplitude modulation signal amplitude-modulated with a modulation frequency of $\omega m$ and a carrier frequency of $\omega c$, and produces an excitation field on the surface of the specimen 25 on the basis of the generated amplitude modulation signal. In this case, it is desirable that the carrier frequency $\omega c$ from the excitation source 206 should be higher than the resonance frequency $\omega r$, and the modulation frequency $\omega m$ from the excitation source 206 should be lower than $1/10$ of the resonance frequency $\omega r$.

The cantilever 202 has the resonance frequency $\omega r$. The signal source 204 generates a signal that vibrates the cantilever 202 at the resonance frequency $\omega r$ at a vibration frequency close to the resonance frequency $\omega r$. The frequency demodulator or phase sensitive detector 208 senses the phase shift of the vibration frequency of the probe 201 with respect to the vibration frequency of the signal generated at the signal source 204.

A measuring system constituted by the deflection detector 207, the frequency demodulator or phase sensitive detector 208, and synchronizing detector 209 detects the phase or frequency shift of the vibration of the probe 201 according to the excitation field generated at the surface of the specimen 205, measures the modulation frequency $\omega m$ component included in the phase or frequency shift. It is said that measured phase or frequency shift is approximately equal to the force gradient.

(Measuring Method)

First, the excitation source 206 is caused to generate an excitation field corresponding to the amplitude modulation signal (with the carrier frequency $\omega c$ and modulation frequency $\omega m$) at the specimen 205 to be measured. In this case, setting is done so that the relationship between the resonance frequency $\omega r$, carrier frequency $\omega c$, and modulation frequency $\omega m$ should satisfy the expression $\omega c>>\omega r$ and $\omega m<<\omega r$.

Next, the probe 201 is brought near the specimen 205, which induces force interaction between the probe and the specimen. At this time, there comes to frequency conversion of the force interaction from the carrier frequency $\omega c$ component of high frequency into the modulation frequency $\omega m$ of low frequency. This $\omega m$ component includes the high frequency ($\omega c$) characteristic, and can be detected with the frequency demodulator or phase sensitive detector 208 and synchronizing detector 209.

The force interaction acting when the probe 201 is brought near the specimen 205 can be measured by causing the frequency demodulator or phase sensitive detector 208 to measure the phase shift of the probe 201 and the synchronizing detector 209 to measure the modulation frequency $\omega m$ component of the phase shift.

Of the signal representing the phase shift of the vibration of the probe 201 sensed by the frequency demodulator or phase sensitive detector 208, the synchronizing detector 209 measures the component synchronizing with a harmonic once or twice as high as the modulation frequency $\omega m$ used in generating an AM (amplitude modulation) signal. Measuring the component synchronizing with the modulation frequency $\omega m$ enables the high-frequency excitation field to be visualized.

The carrier frequency $\omega c$ of the AM signal applied to the specimen 205 is changed. Then, the modulation frequency $\omega$ component of the frequency shift or the phase shift of the probe vibration is measured for each of the carrier frequencies $\omega c$ at the synchronizing detector 208, thereby measuring the frequency response characteristic of the specimen 205.

The spring constant of the cantilever 202 has to be changed according to the measuring distance between the probe 201 and the measuring side of the specimen 5 such that the probe does not jump in the specimen. To improve the spatial resolution, the measuring distance between the probe 201 and the measuring side of the specimen 5 must be made as small as possible. When the probe 201 is brought too near the cantilever 202 and therefore the force interaction acting on the probe 201 becomes larger than the spring constant of the cantilever 202, the cantilever 202 cannot support the probe 201. As a result, the probe 201 comes into contact with the surface of the specimen 205 and sticks to the surface of the specimen 205, which prevents measurement. Since the force interaction acting on the probe 201 varies, depending on the material of the surface of the specimen 205 or the type of excitation field, the spring constant of the cantilever 202 must be changed according to the material of the surface of the specimen 205 or the type of excitation field.

In the measurement, the specimen, excitation method, and probe should be selected in accordance with the physical amount to be measured. For example, in the measurement of a high frequency electric-field response of the specimen 205, a voltage is applied to the specimen 205 (in the case where the specimen 205 is an insulator, a high-frequency electric field is applied to the specimen 205 by providing an electrode on the back of the specimen 205, for example) and probe 201 made of conductive substance (e.g., metal, semiconductor, etc.) is used. For measuring magnetic characteristics, probe 201 formed by causing magnetic substance to adhere to magnetic substance or nonmagnetic substance is used and excitation source 206 having a coil for generating magnetic field is used to apply a current to the specimen 205, for example.

The excitation source 206 is typically formed by a signal generator which applies a electric signal directly to the specimen 205 or supplies the signal to a device for generating an excitation field.

A signal of the signal source 204 is set to generate the resonance frequency $\omega r$ or a frequency near the resonance frequency.

The deflection detector 207 can be used in the measurement with an optical interference refractometer, four-piece splitting photodiode, or the measurement of an electric signal generated by the displacement of the cantilever, or the like.

Not only a mere detection method using an LC resonance circuit and a diode, but also a detection method such as a peak differential detection, a radio detection, a Foster Seeley detection, a PLL (Pulse Lock Loop) demodulation, a SSB (Single Sideband) demodulation, a digital demodulation using a DSP (Digital Signal Processor) are adaptable to the frequency demodulator or phase sensitive detector 208.

For the measurement of frequencies, a feedback control system is constituted by the deflection detector 207, signal source 204, actuating piezoelectric element 203, probe 201. This feedback control system can also sense a frequency shift. In this case, a phase controller may be incorporated in the system to appropriately vibrate the cantilever 202.

In the measurement, a scanning piezoelectric element is provided to the cantilever 202 and/or the specimen 205, three-dimensionally relative position of the specimen 5 is controlled, and a computer is used to control the measurement and store data. The measurement is carried out while the shape of the surface of the specimen 205 is measured, or these measurements are selectively carried out by switch (as disclosed by U.S. Pat. No. 5,418,363). Such the measurements may be carried out in various circumstances (e.g., in air, in liquid, in vacuo).

For the measurement of the shape of the surface of the specimen 205, a contact mode (G. Binnig, C. F. Quate and Ch. Gerber, Physical Review Letters 56 (1086) 930.), a tapping mode (U.S. Pat. No. 5,412,980), a slop detection (Y. Martin, C. C. Williams and H. K. Wickramasinghe, Journal of Applied Physics 61 (1987) 1307), a noncontact dynamic mode with frequency modulation detection method (T. R. Albrecht, P. Frutter, D. Horne, and D. Rugar, Journal of Applied Physics, 69 (1991) 668.) are selectively used in accordance with the specimen to be measured, probe, and circumstance.

Regarding the measurement using the high-frequency scanning probe microscope, as shown in FIGS. 2A and 2B, various examples of measurement, differing in the specimen to be measured, excitation field, probe, each condition for the physical amount of measurement, or excitation field generating method, may be used in place of the example of measurement shown in the first embodiment.

As has been explained in detail, with the present invention represented by the first embodiment, generating an amplitude-modulated excitation field enables the frequency component corresponding to the amplitude-modulated carrier frequency to be converted into low frequency for measurement, and it is possible to realize measurement with high-frequency response.

Second Embodiment

A second embodiment of the present invention will be explained.
(Configuration of Magnetic Recording Head Measuring Apparatus)

Figure 3:
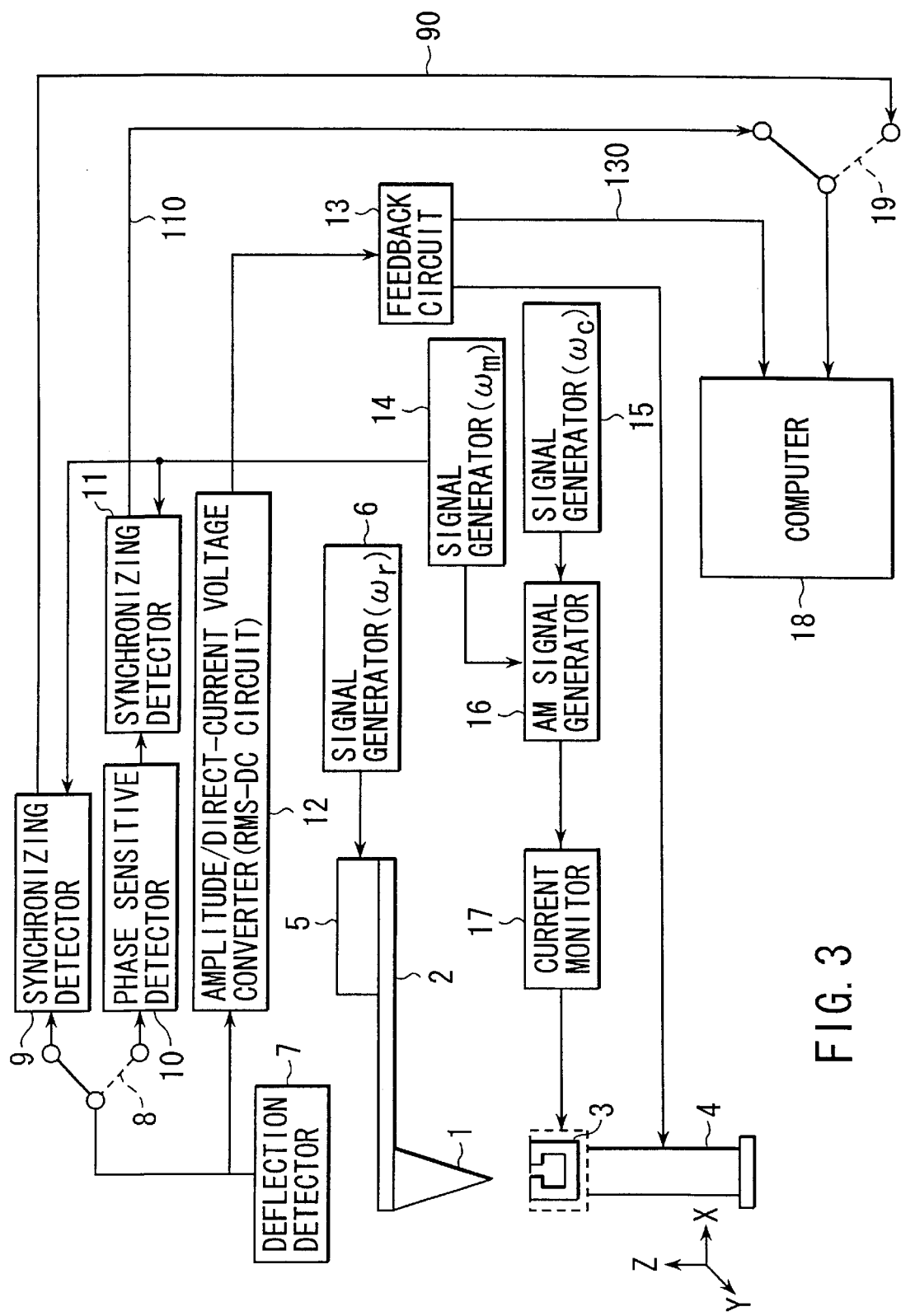
FIG. 3 is a block diagram showing the main part of a magnetic recording head measuring apparatus according to a second embodiment of the present invention.

As shown in FIG. 3, a magnetic recording head measuring apparatus (hereinafter, head measuring apparatus) according to a second embodiment of the present invention includes a probe 1, a cantilever 2 having a resonance frequency ($\omega r$) provided with the probe 1, a scanning piezoelectric element member 4 for performing driving control of a specimen 3 near the probe 1 in each of the directions of the X-axis, Y-axis, and Z-axis, and an actuating piezoelectric element 5 for vibrating the cantilever 2 at a constant amplitude. The specimen 3 is a magnetic recording head to be measured.

The head measuring apparatus further includes a signal generator 6 for generating a signal for driving the actuating piezoelectric element 5 (to vibrate the cantilever 2 at a vibration frequency which is the resonance frequency $\omega r$ or a frequency near the resonance frequency), a deflection detector 7 for detecting the displacement of the cantilever 2, a switch 8 for switching the destination to which the deflection detector 7 outputs the sense signal, a synchronizing detector 9 constituting the force measuring system, a phase sensitive detector 10 constituting the force gradient measuring system, a synchronizing detector 11, an amplitude/direct-current voltage converter 12 for measuring the effective value of the deflection detector 7, and a feedback circuit 13 for making the output of the converter 12 constant. The feedback circuit 13 includes a driver that controls the scanning piezoelectric element member 4 in accordance with the output of the converter 12 to perform driving control of the specimen 3 in each of the directions of the X-axis, Y-axis, and Z-axis. The feedback circuit 13 also has the function of outputting a signal (digital data) 130 representing an topographical image of the specimen 3 on the basis of the output of the converter 12 to a computer 18.

The computer 18 not only controls the whole of the head measuring apparatus but also carries out the process of measuring the force image on the basis of the output signal 90 from the synchronizing detector 9 constituting the force measuring system and further measuring the force gradient image on the basis of the output signal 110 from the synchronizing detector 11 constituting the force gradient measuring system (the process including a display process and a storage process). The force image and force gradient image are high-frequency head images related to the magnetic force interaction caused by the high-frequency magnetic field of the magnetic recording head. The computer 18 changes the setting of the switch 19, thereby selectively taking in either the output signal 90 from the force measuring system or the output signal 110 from the force gradient measuring system.

In the second embodiment, the amplitude-modulated (AM) high-frequency signal current is applied to the specimen 3. A current monitor 17 detects a signal current according to the AM signal generated from an AM signal generator 16 and has the function of adjusting the value of the signal current. The AM signal generator 16 generates an AM signal having a modulation frequency (i.e. sideband frequency) ($\omega m$) set by a first signal generator 14 and a carrier frequency ($\omega c$: $\omega c >> \omega r$) set by a second signal generator 15. The modulation frequency indicates an amplitude modulation frequency of the AM signal.
(Magnetic Force Measuring Method)

Figure 4:
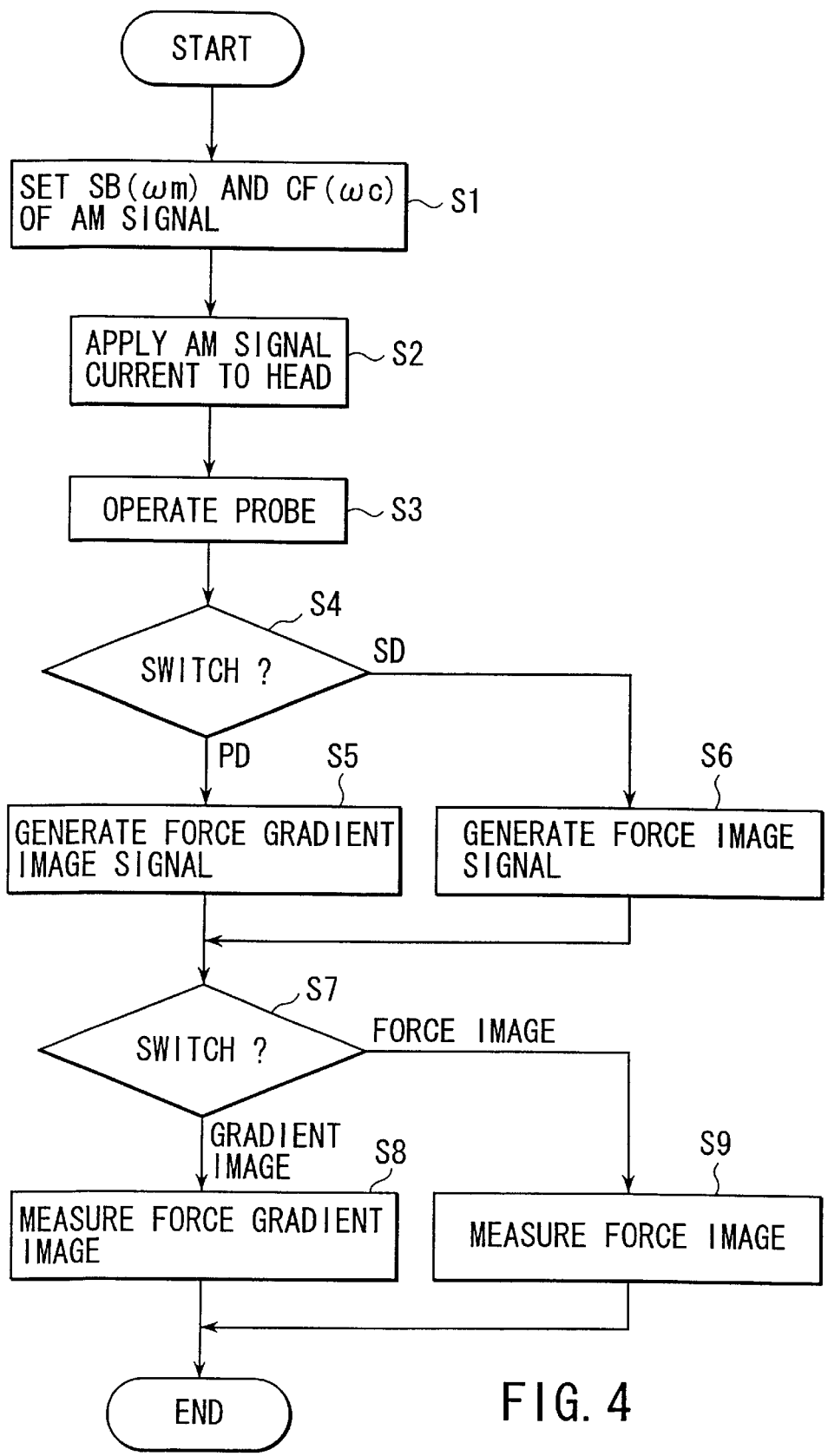
FIG. 4 is a flowchart to help explain a measuring method according to the second embodiment.

Hereinafter, the measuring method in the second embodiment will be explained by reference to a flowchart in FIG. 4 as well as FIG. 3.

The specimen 3, a magnetic recording head to be measured, is positioned on a specific member that is driven by the scanning piezoelectric element member 4. The modulation frequency SB ($\omega m$) and carrier frequency CF ($\omega c$) of an AM signal generated from the AM signal generator 16 are set (step S1). Specifically, the SB ($\omega m$) is set by the first signal generator 14 and the CF ($\omega c$) is set by the second signal generator 15. The current monitor 17 detects a signal current according to the AM signal having the SB ($\omega m$) and CF ($\omega c$) components from the AM signal generator 16 and applies the signal current to the specimen 3 (step S2).

Next, the probe 1 provided on the cantilever 2 is brought close to the specimen 3 (step S3). At this time, the actuating piezoelectric element 5 driven by the signal (of a frequency approximating, for example, the resonance frequency $\omega r$ of the cantilever 2) from the signal generator 6 is vibrating the cantilever 2 at a constant amplitude. It is to be noted that the modulation frequency SB ($\omega m$) included in the signal current applied to the specimen 3 is set so that it may fulfill the expression $\omega m << \omega r$, where $\omega r$ is the signal frequency from the signal generator 6 related to the vibration applied to the cantilever 2.

The magnetic field generated from the specimen 3 induces the force and force gradient having the low-frequency AC component ($\omega m$) to the probe 1 brought close to the specimen 3. The AC component ($\omega m$) includes information on the high-frequency AC ($\omega c$) component. Since the frequency of the AC component ($\omega m$) is sufficiently smaller than the resonance frequency ($\omega r$) of the cantilever 2 as described above, it is relatively easy to sense the AC component. Thus, setting the value ($\omega c$) of the carrier frequency CF from the second signal generator 15 at several MHz to GHz makes it possible to measure the high-frequency magnetic field distribution generated from the specimen 3.

On the basis of such a principle, the high-frequency magnetic field distribution generated from the specimen 3 induces force and force gradient to the probe 1. The deflection detector 7 senses the force and force gradient in the form of the displacement of the cantilever 2. The computer 18 controls the switches 8 and 19 so as to not only measure the topographical image of the specimen 3 (corresponding to measurement signal 130) but also alternately measure the force image (corresponding to measurement signal 90) and force gradient image (corresponding to measurement signal 110) (steps S4 and S7).

Specifically, the computer 18 takes in the measurement signal 130 representing the topographical image of the specimen 3 from the measuring system composed of the deflection detector 7, amplitude/direct-current voltage converter 12, and feedback circuit 13 and measures the topographical image. Then, the computer 18 changes over the switches 8 and 19 to the force measuring system, takes in the measurement signal 90 from the synchronizing detector 9 constituting the force measuring system, and measures the force image (steps S6 and S9). That is, the force measuring system measures the force approximately correlating with the displacement of the cantilever 2.

On the other hand, the computer 18 changes over the switches 8 and 19 to the force gradient measuring system, takes in the measurement signal 110 from the phase sensitive detector 10 and the synchronizing detector 11 constituting the force gradient measuring system, and measures the force gradient image (steps S5 and S8). That is, the force gradient measuring system measures the force gradient approximately correlating with the phase shift of the cantilever 2.

Specifically, the force gradient is measured as follows. The phase sensitive detector 10 senses the phase shift (i.e., a change in the phase of the vibration frequency of the probe with respect to the frequency $\omega r$ of the signal that vibrates the cantilever 2). The synchronizing detector 11 measures the modulation frequency $\omega m$ component included in the phase shift. On the basis of the modulation frequency $\omega m$ component, the computer 18 measures the force gradient.

As described above, with the head measuring apparatus according to the second embodiment, it is possible to realize measurement with high-frequency response by the method of applying an amplitude-modulated high-frequency current to the magnetic recording head to be measured. It is also possible to measure not only the topographical image of the magnetic recording head but also the force image and/or force gradient image do to high-frequency magnetic field. Since the force gradient, the differentiation of force applied by the distribution of the high-frequency magnetic field generated from the specimen with respect to distance can be selectively measured, measurement and analysis can be made with a high sensitivity and a high resolution.

FIGS. 5A to 5C and FIGS. 6A to 6C show examples of measurements when the force gradient image and force image of the magnetic recording head are measured with the head measuring apparatus of the second embodiment.

FIG. 5A shows a force gradient image, a high-frequency head image obtained from the force gradient measuring system in the head measuring apparatus of the second embodiment. The image of the force gradient shown in FIG. 5A is obtained by the computer 18 from the values of the force gradients measured at a plurality of measuring positions on the magnetic recording head, while the magnetic recording head is being moved in each of the directions of the X-axis, Y-axis, and Z-axis by means of the scanning piezoelectric element member 4. The image reflects the distribution of the magnetic field generated by the magnetic recording head.

Figure 7:
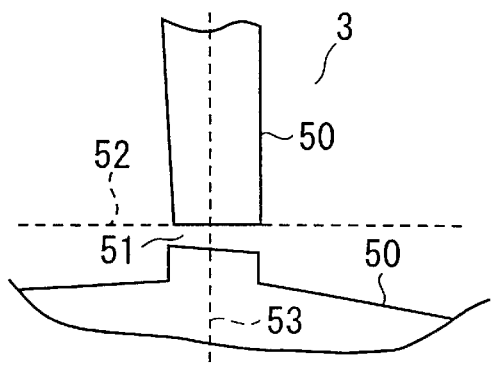
FIG. 7 shows the relationship between the position of the gap in a specimen and its profile in an example of measurement in the second embodiment.

FIGS. 5B and 5C show line profiles. Here, the magnetic recording head (specimen 3) to be measured has a gap 51 between magnetic poles 50. The value (amplitude) of the signal current the current monitor 17 applies to the specimen is 20 mA. The carrier frequency CF of the AM signal for generating the signal current is $\omega c = 10$ MHz and the modulation frequency SB is $\omega m = 2\pi \times 300$ Hz. The operating range of the probe 1 is 5 $\mu m \times 5$ $\mu m$. The range 30 in FIG. 3A corresponds to the gap 51 in the magnetic recording head and to the position where the high-frequency magnetic field is great. FIG. 3B shows a line profile (corresponding to line 52 in FIG. 7) indicating that the magnetic field is great in the vicinity of the position of the gap. FIG. 3C shows a line profile (corresponding to line 53 in FIG. 7) indicating a peak 31 regarded as appearing as a result of the loss due to excess current at the edge portion of the gap.

Figure 6A:
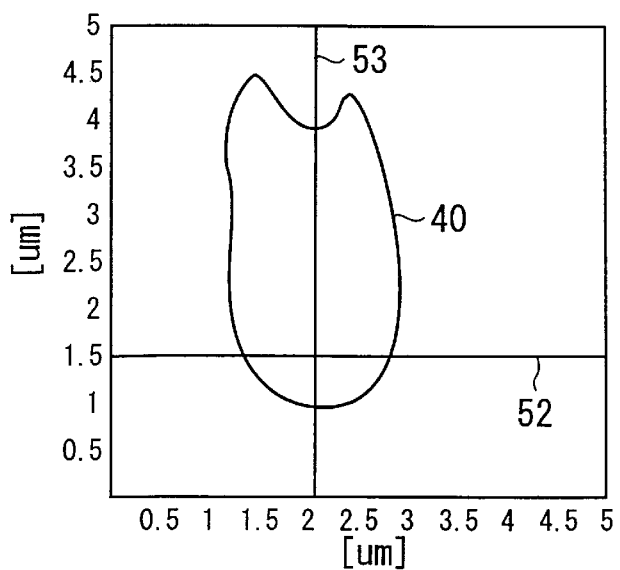
FIGS. 6A to 6C are diagrams showing an example of measuring a force image in the second embodiment.
Figure 6B:
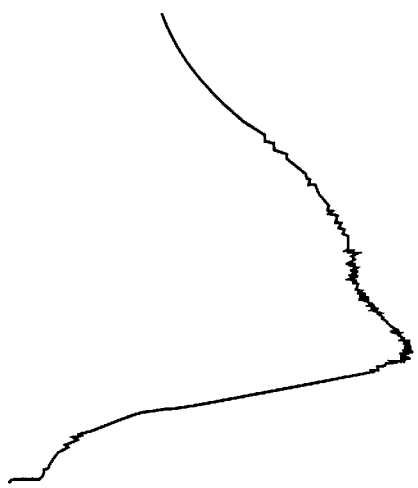
Figure 6C:
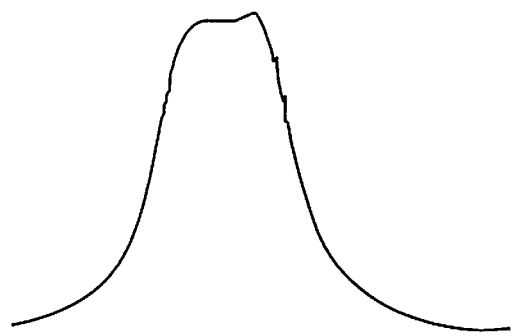

FIG. 6A is a force image, a high-frequency head image obtained from the force measuring system in the head measuring apparatus according to the second embodiment. FIGS. 6B and 6C show line profiles (corresponding to the lines 52 and 53 in FIG. 7). The magnetic recording head 3 to be measured and the probe 1 are the same as those in the example of measurements in FIGS. 5A to 5C. The measurement conditions are the same except that the modulation frequency SB of the AM signal meets the following: $\omega m = \omega r = 47.2$ kHz. The range 40 in FIG. 6A corresponds to the gap in the magnetic recording head and to the position where the high-frequency magnetic field is great. FIG. 6B shows a line profile indicating that the magnetic field becomes great in the vicinity of the position of the gap. The change of the contrast in the line profile in FIG. 6B is gentler than that in FIG. 5B and indicates that the resolution is low. FIG. 6C shows a case where the peak 31 in FIG. 5C regarded as appearing as a result of the loss due to excess current at the edge portion of the gap cannot be recognized.

The examples of measurements have shown that the force gradient measuring system has a higher resolution than the force measuring system and can measure an image reflecting well the high-frequency magnetic field generated from the magnetic recording head.

In the second embodiment, the carrier frequency CF ($\omega c$) of the AM signal is set at a value higher than the resonance frequency ($\omega r$) of the cantilever 2. If the carrier frequency CF ($\omega c$) were set close to the resonance frequency ($\omega r$), the accurate measurement image could not be obtained, because the cantilever 2 itself would store the energy acting on the probe 1. Moreover, setting the carrier frequency CF ($\omega c$) lower than the resonance frequency ($\omega r$) is meaningless from the viewpoint of high-frequency measurement.

It is desirable that the modulation frequency SB ($\omega m$) of the AM signal should be set at $\frac{1}{10}$ or less of the resonance frequency ($\omega r$) of the cantilever 2, from the viewpoints of the response speed of the cantilever 2, and the band width of the phase sensitive detector 10.

The feedback circuit 13 of the second embodiment controls the scanning piezoelectric element member 4 on the basis of the output (i.e., the topographical image of the specimen 3) from the converter 12.

Furthermore, the vibrating frequency or vibration amplitude of the cantilever 2 may be controlled. Generally, the intensity of the magnetic field from the magnetic recording head is too high, it has an effect on the shape of the surface of the head, lowering the measurement accuracy of the high-frequency magnetic field. In this case, shifting the vibrating frequency of the cantilever 2 from the resonance frequency (ωr) or making the vibration amplitude larger or lower makes it possible to make measurements while reducing the great effect of the intensity of the magnetic field from the head.

Furthermore, the computer 18 of the second embodiment has not only the function of setting and storing the condition for the signal current that the AM signal generator 16 and current monitor 17 apply to the head 3 but also the function of monitoring and controlling the states of both of the AM signal generator 16 and current monitor 17. The computer 18 further has the function of recording and storing the measurement signals 90, 110, 130, calculating the difference between measurement images, determining the position of the magnetic field from the head 3, and displaying the contrast at that portion effectively (see FIGS. 5A to 5C and FIGS. 6A to 6C). With these functions, the computer 18 can determine a portion where a change in the intensity of the magnetic field of the head 3 is great and change the contrast at that portion, thereby visualizing the position at which the magnetic field occurred. In addition, the computer 18 has the function of storing the condition for the signal current applied to the head 3 and the measurement signal at the same time and carrying out the measuring and analyzing process efficiently.

As has been explained in detail, with the present invention represented by the second embodiment, it is possible to provide a head measuring apparatus to which a method of causing a magnetic recording head to be measured to generate a high-frequency magnetic field by means of the magnetic force microscope and then measuring the magnetic force is applied. Thus, it is possible to realize measurement with high-frequency response by a method of applying an amplitude-modulated high-frequency current to the recording head to be measured. Furthermore, since the force gradient image can be selectively measured in addition to the force image the magnetic field of the specimen applies to the probe, measurement and analysis can be made with a high sensitivity and a high resolution.

Third Embodiment

A third embodiment of the present invention will be explained.

(Configuration of Magnetic Recording Head Measuring Apparatus)

Figure 8:
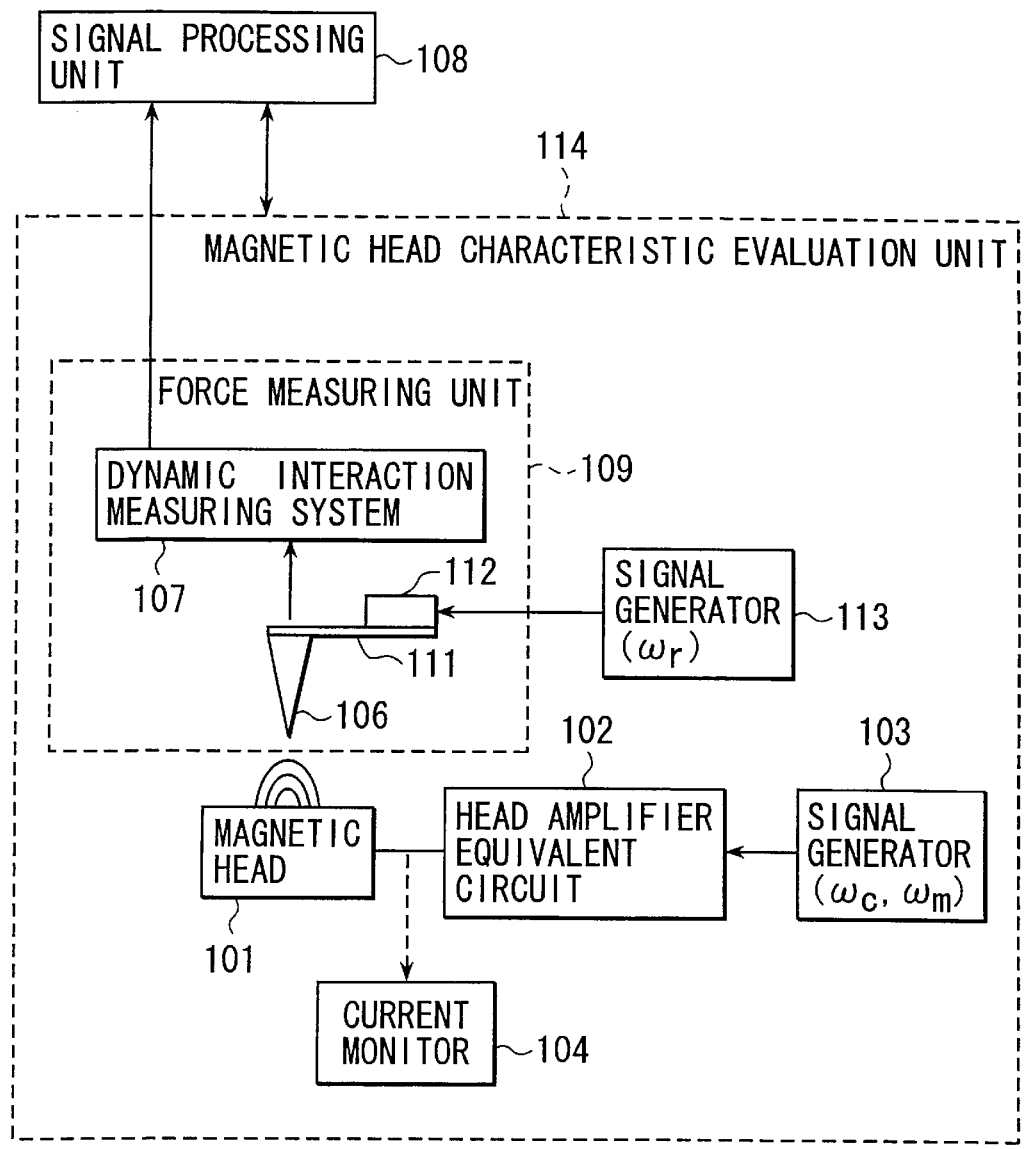
FIG. 8 is a block diagram showing the main part of a magnetic recording head measuring apparatus according to a third embodiment of the present invention.

FIG. 8 is a block diagram showing the main part of a magnetic recording head measuring apparatus according to a third embodiment of the present invention.

As shown in FIG. 8, the head measuring apparatus of the third embodiment includes a magnetic recording head 101 to be measured, a head amplifier equivalent circuit 102 for applying current to the magnetic recording head 101, a signal generator 103 for controlling the value and frequency of the current flowing through the head amplifier equivalent circuit 102, a current monitor 104 for measuring the current flowing through the magnetic recording head 101, a probe 106 which acts as a vibrator made of magnetic substance or coated with magnetic substance and magnetized and is for measuring the high-frequency magnetic field generated from the magnetic recording head 101, a dynamic interaction measuring system 107 for measuring the dynamic interaction between the magnetic recording head 101 and the probe 106, and a signal processing unit 108 for storing and processing one or more signals output from the dynamic interaction measuring system 107.

The head measuring apparatus further includes a cantilever 111 for supporting the probe 106, an actuating piezoelectric element 112 for vibrating the cantilever 111 at its resonance frequency ωr (or a frequency in the vicinity of the resonance frequency), and a signal generator 113 for supplying a signal of the resonance frequency ωr (or a frequency in the vicinity of the resonance frequency) to the actuating piezoelectric element 112.

In the head measuring apparatus of the third embodiment, the probe 106, cantilever 111, actuating piezoelectric element 112, and dynamic interaction measuring system 107 constitute a force measuring unit 109. In addition, the force measuring unit 109, magnetic recording head 101, head amplifier equivalent circuit 102, signal generator 103, current monitor 104, and signal generator 113 constitute a magnetic head characteristic evaluating unit 114. The magnetic head characteristic evaluating unit 114 is capable of extracting the amplitude component synchronizing with the modulation frequency of amplitude modulation of the dynamic interaction measured at the dynamic interaction measuring system 107 and thereby obtaining the component of the magnetic field dependent on the carrier frequency.

The head measuring apparatus of FIG. 8 has all the functions of the individual component elements in FIG. 3.

For example, the magnetic recording head 101 in FIG. 8 corresponds to the specimen (magnetic recording head) 3 in FIG. 3. The signal generator 103 includes the functions corresponding to the signal generator 14, signal generator 15, and AM signal generator 16 in FIG. 3. The current monitor 104 corresponds to the current monitor 17 in FIG. 3.

The probe 106, cantilever 111, actuating piezoelectric element 112, and signal generator 113 in FIG. 8 correspond to the probe 1, cantilever 2, actuating piezoelectric element 5, and signal generator 6, respectively. The dynamic interaction measuring system 107 includes the functions corresponding to the deflection detector 7, switch 8, synchronizing detector 9, phase sensitive detector 10, synchronizing detector 11, and switch 19 in FIG. 3. The signal processing unit 108 includes the function corresponding to the computer 18 in FIG. 3.

Although not shown in FIG. 8, the head measuring apparatus also includes the component parts corresponding to the scanning piezoelectric element member 4, amplitude/direct-current voltage converter 12, and feedback circuit 13 in FIG. 3.

The force measuring unit 109 of the third embodiment has the function of scanning the probe 106 three-dimensionally, the function of measuring the dynamic interaction between the magnetic recording head 101 and with the probe 106 in a high-frequency magnetic field, and the function of measuring the shape of the surface of the magnetic recording head 101. These functions can be realized by using a commercially available or a self-made scanning probe microscope (SPM).

The signal processing unit 108 of the third embodiment not only stores the obtained data but also controls and monitors the magnetic head characteristic evaluating unit 114 including the force measuring unit 109. It also has the function of storing the measuring condition and measurement data of the magnetic head characteristic evaluating unit 114 collectively and enabling the analysis of data after experiments.

In the third embodiment, since the circuit (a kind of voltage-current converter) equivalent to the head amplifier can be driven at high frequency, the frequency characteristic of the magnetic recording head can be measured in such a manner that the frequency characteristic is separated into the electrical characteristic (the characteristic of the parts including the head amplifier and/or the wires on the slider portion) and the magnetic characteristic (the characteristic of the head magnetic material and/or head geometry).

In the third embodiment, the signal generator 103 generates an amplitude-modulated signal with a carrier frequency of ωc and a modulation frequency of ωm. On the other hand, the signal generator 113 supplies a signal with a resonance frequency of ωr (or a frequency in the vicinity of the resonance frequency) to the actuating piezoelectric element 112. Thus, the supply of the signal causes the actuating piezoelectric element 112 to vibrate the cantilever 112 supporting the probe 106 at its resonance frequency ωr (or a frequency in the vicinity of the resonance frequency).

(Measuring Method)

Hereinafter, the measuring method in the third embodiment will be described by reference to FIG. 8 and the flowcharts of FIGS. 9 and 10.

Figure 9:
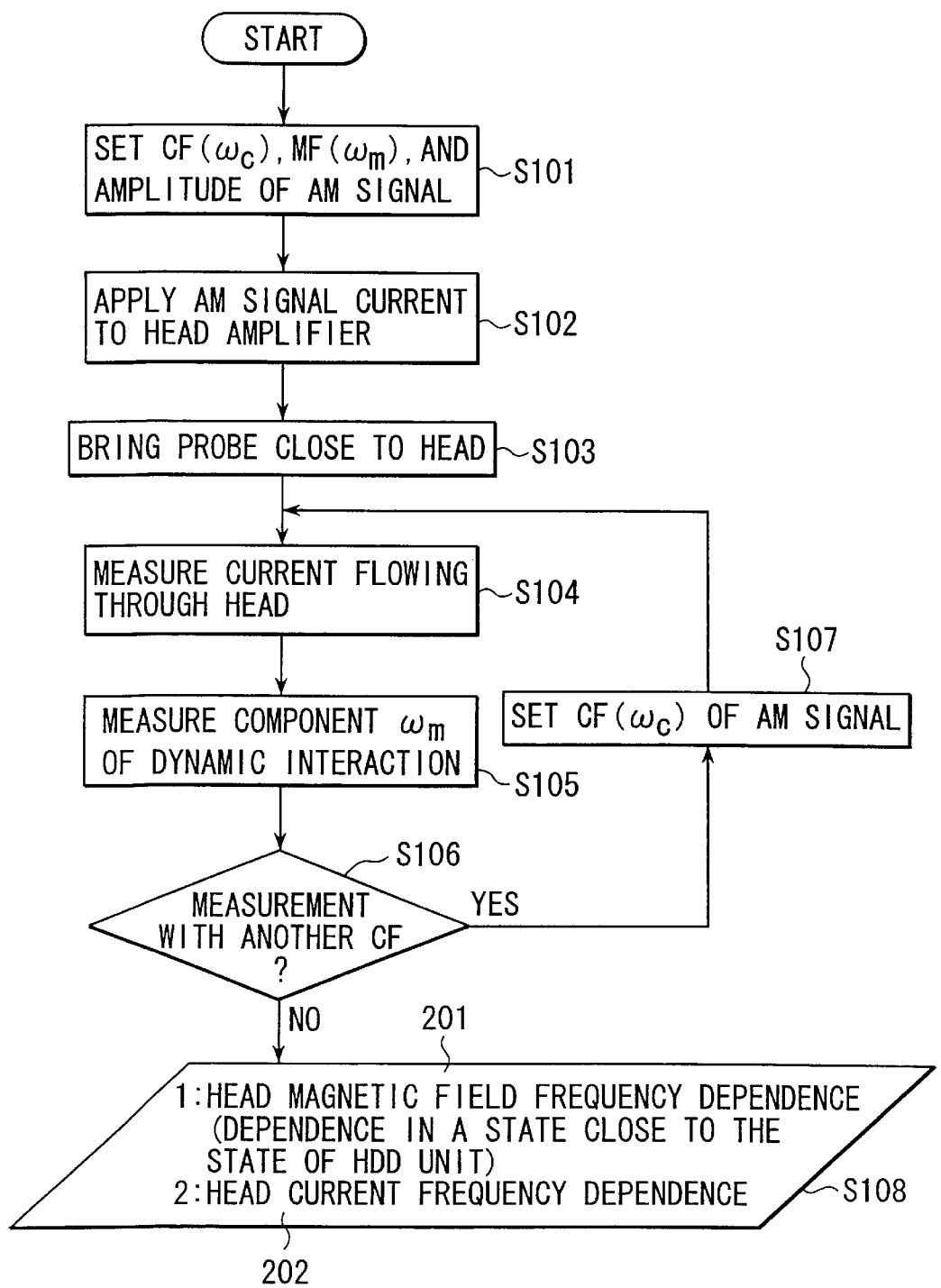
FIG. 9 is a flowchart to help explain a measuring method according to the third embodiment.
Figure 10:
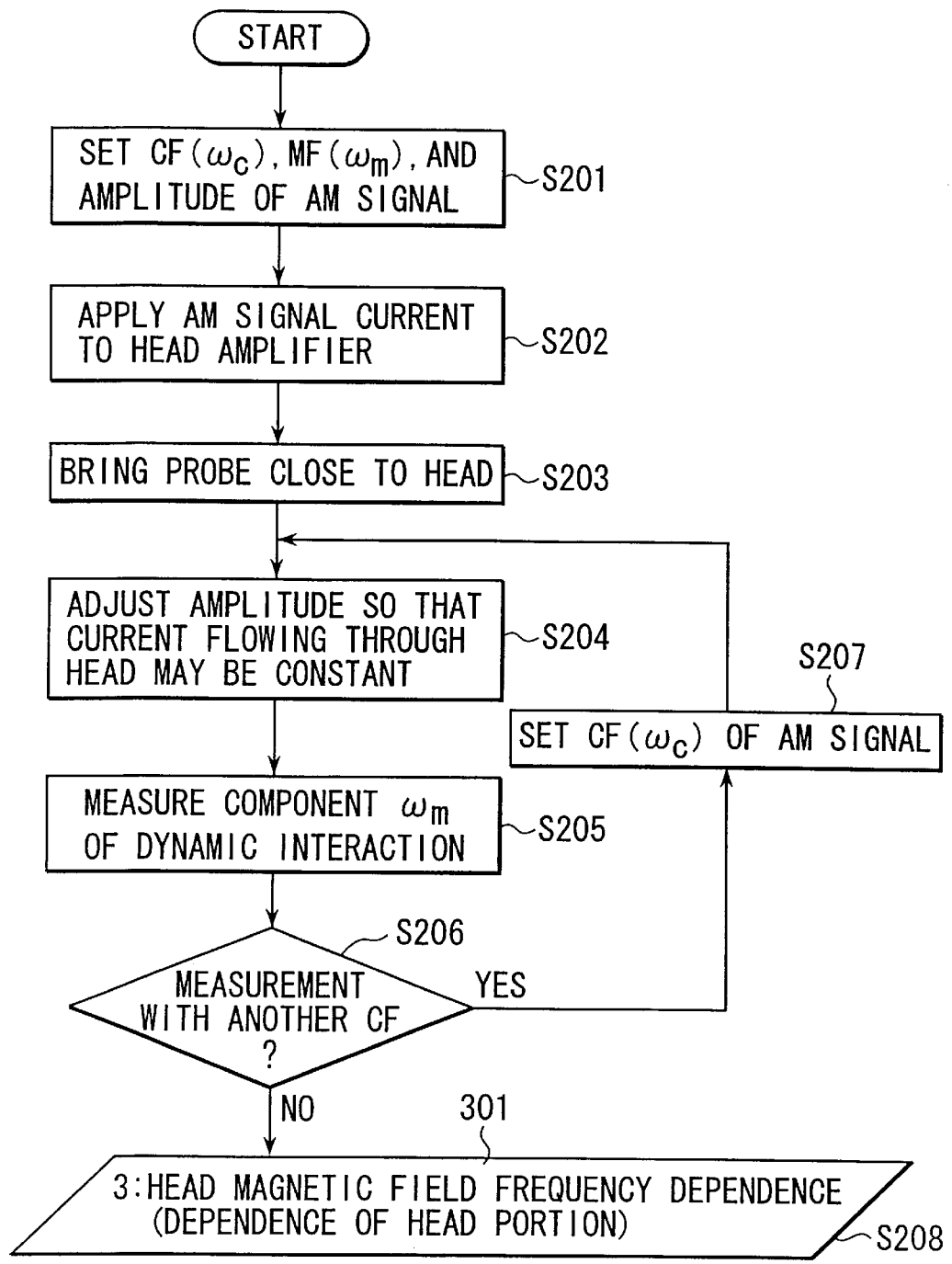
FIG. 10 is a flowchart to help explain a measuring method according to the third embodiment.

The frequency characteristic of the magnetic recording head in the third embodiment is measured according to the processes shown in FIGS. 9 and 10. In the processing of FIG. 9, the following can be measured: (1) the head magnetic field frequency dependence of the cantilever phase shift (i.e., phase shift-frequency characteristic) in an environment similar to an HDD-situ condition, and (2) the head current frequency dependence (i.e., current-frequency characteristic) concerning the value of current flowing through the magnetic recording head. On the other hand, in the processing of FIG. 10, (3) the head magnetic field frequency dependence (i.e., phase shift-frequency characteristic) concerning the magnetic recording head portion (mainly related to the magnetic substance) can be measured.

First, in FIG. 9, the magnetic recording head 101 to be measured is placed in a specific measuring position. The carrier frequency CF (ωc), modulation frequency MF (ωm), and amplitude of the amplitude modulation signal at the signal generator 103 are set (step S101). Here, the modulation frequency MF (ωm) is set at a frequency much lower than the resonance frequency ωr of the cantilever 111. The amplitude modulation signal output from the signal generator 103 is applied to the head amplifier equivalent circuit 102 (step S102), causing the magnetic recording head 101 to generate a magnetic field. The probe 106 is brought close to the magnetic recording head (step S103), making it possible to measure the dynamic interaction caused by the head magnetic field. The current monitor 104 measures the value of the current flowing through the magnetic recording head 101 (step S104), thereby measuring the ωm component of the force interaction acting on the probe 106 (step S105). The measurement in step S105 is made in one of the following two cases: (1) one case where the probe 106 is brought close to the magnetic recording head 101 and measurement is made at one point without the scanning of the probe 106 and (2) the other case where the probe 106 is caused to scan so as to measure the one-dimensional profile or two-dimensional image, then an arbitrary point is selected, and the ωm component at that position is set as the measured value. When measurement is made with another carrier frequency CF (ωc), the carrier frequency CF of the amplitude modulation signal of the signal generator 103 is set (step S107) and the measurements at steps S104 and S105 are repeated. From the results at the individual frequencies, the following are obtained: (1) the head magnetic field frequency dependence 202 in a state similar to an HDD-situ condition and (2) the head current frequency dependence 202 concerning the value of current flowing through the magnetic recording head (step S108).

Next, in FIG. 10, the magnetic recording head 101 to be measured is placed in a specific measuring position. The carrier frequency CF (ωc), modulation frequency MF (ωm), and amplitude of the amplitude modulation signal at the signal generator 103 are set (step S201). Here, the modulation frequency MF (ωm) is set at a frequency much lower than the resonance frequency ωr of the cantilever 111. The amplitude modulation signal output from the signal generator 103 is applied to the head amplifier equivalent circuit 102 (step S202), causing the magnetic recording head 101 to generate a magnetic field. The probe 106 is brought close to the magnetic recording head (step S203), making it possible to measure the dynamic interaction caused by the head magnetic field. The amplitude of the signal generator 103 is adjusted so that the value of current flowing through the magnetic recording head 101 may be equal to a predetermined value (step S204), thereby measuring the ωm component of the force interaction acting on the probe 106 (step S205). The measurement in step S205 is made in one of the following two cases: (1) one case where the probe 106 is brought close to the magnetic recording head 101 and measurement is made at one point without the scanning of the probe 106 and (2) the other case where the probe 106 is caused to scan so as to measure the one-dimensional profile or two-dimensional image, then an arbitrary point is selected, and the ωm component at that position is set as the measured value. When measurement is made with another carrier frequency CF (ωc), the carrier frequency CF of the amplitude modulation signal of the signal generator 103 is set (step S207) and the measurements at steps S204 and S205 are repeated. From the results at the individual frequencies, (3) the head magnetic field frequency dependence 301 reflecting only the characteristic of the magnetic recording head portion is obtained (step S208).

Figure 11:
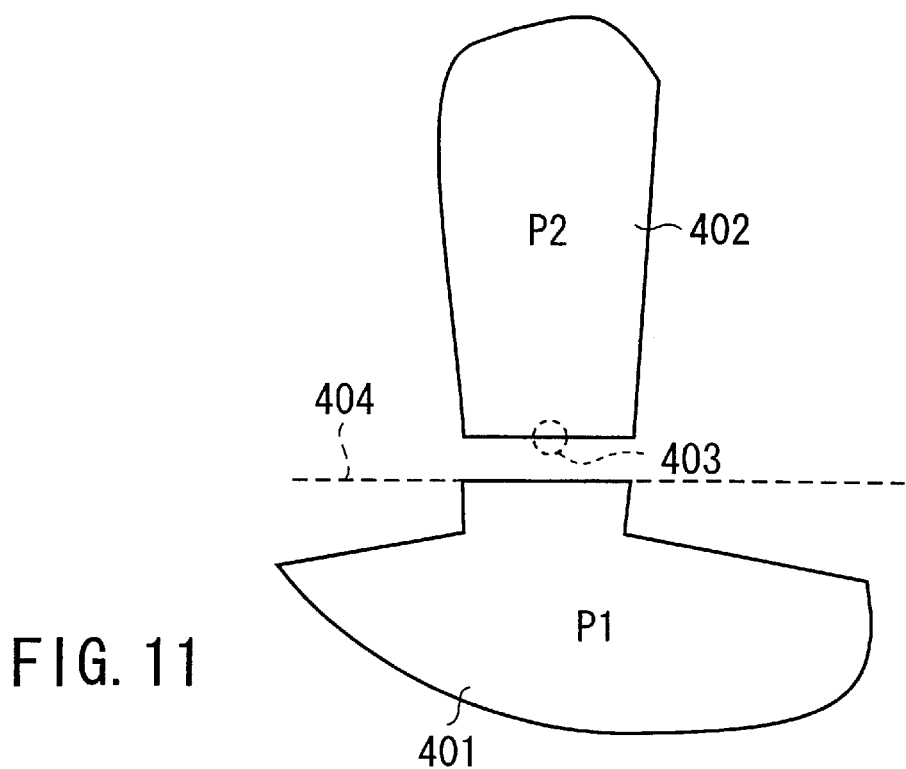
FIG. 11 is a diagram to help explain the measuring position and others in the magnetic recording head of the third embodiment.
Figure 13:
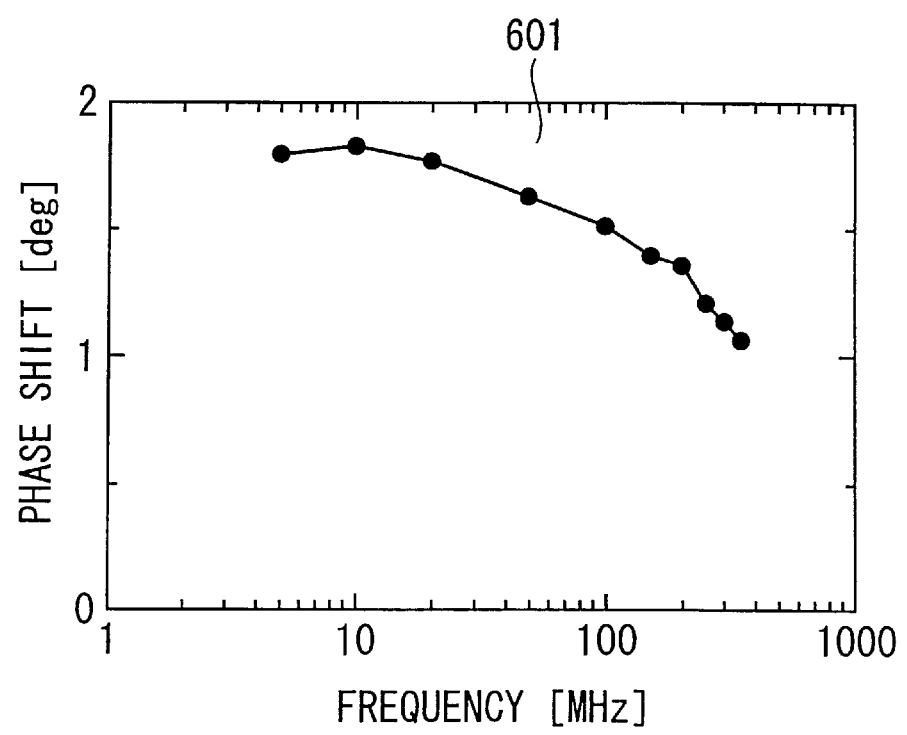
FIG. 13 is a graph showing the head magnetic field frequency dependence obtained in the processing of FIG. 10.
Figure 12A:
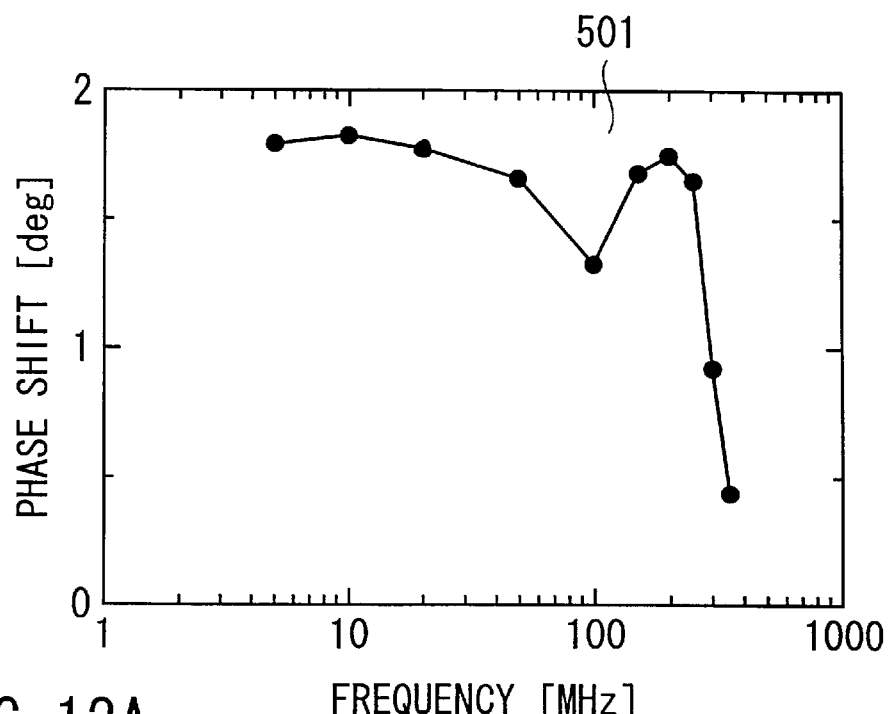
FIGS. 12A and 12B are graphs showing the head magnetic field frequency dependence and head current frequency dependence obtained in the processing of FIG. 9, respectively.
Figure 12B:
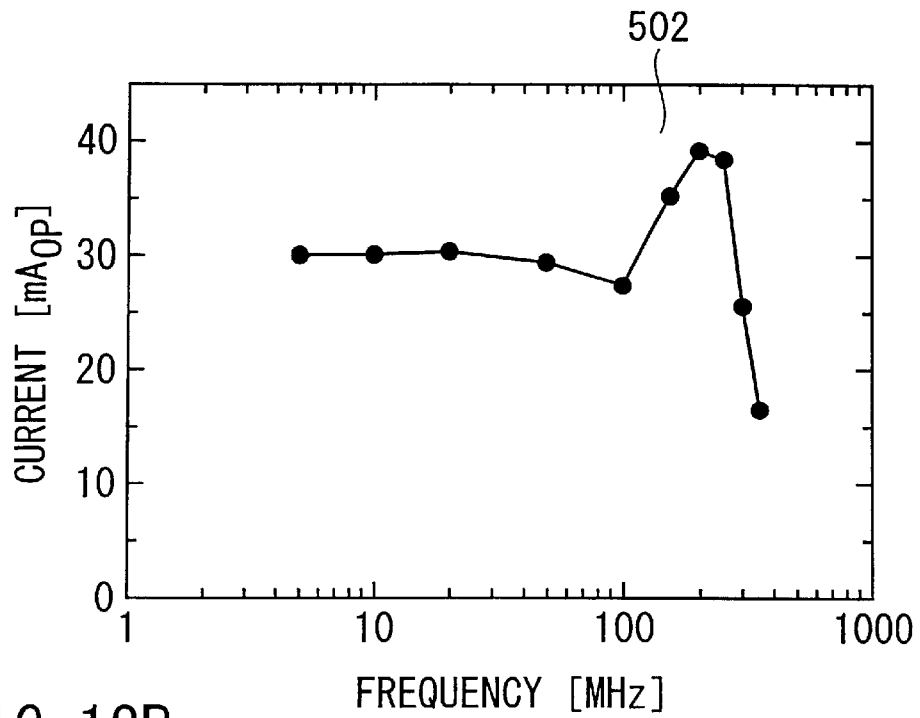

FIG. 11 is a diagram to help explain the measuring position and others in the magnetic recording head. FIGS. 12A and 12B are graphs corresponding to the head magnetic field frequency dependence 201 and head current frequency dependence 202 obtained in the processing of FIG. 9, respectively. FIG. 13 is a graph 601 corresponding to the head magnetic field frequency dependence 301 obtained in the processing of FIG. 10. The measuring position in these results was at the center of the gap edge 403 of the P2 magnetic pole 402. The phase shift in graph 501 in FIG. 12A and graph 601 in FIG. 13 represents the intensity of a magnetic field in MFM measurement and means that as the value becomes larger, the intensity of the magnetic field increases.

It is seen from the graph 501 in FIG. 12A that the dependence is almost constant at frequencies from 5 to 20 MHz and an uniform magnetic field has generated. The phase shift begins to decrease in the vicinity of 50 MHz and takes a minimal value near 100 MHz. The phase shift takes a maximal value at about 230 MHz and decreases at frequencies higher than 230 MHz. In graph 502 in FIG. 12B, although there is no minimal value, a maximal value appears at the same frequency as in graph 501 in FIG. 12A. On the other hand, in graph 601 in FIG. 13, the phase shift takes neither a minimal value nor a maximal value and decreases as the frequency becomes higher. The rate of decrease becomes greater as the frequency increases.

Figure 14:
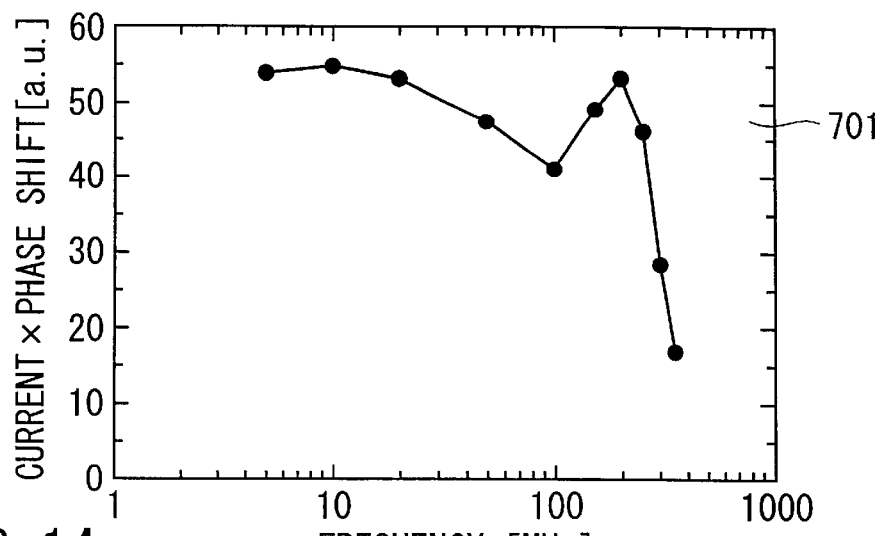
FIG. 14 is the resulting graph obtained by multiplying the frequency characteristic in the graph in FIG. 13 by the frequency characteristic in the graph in FIG. 10B.

Here, consideration will be given to the reason why the head magnetic field frequency dependence in a state similar to an HDD-situ condition has the characteristic shown in graph 501 in FIG. 12A. Graph 501 in FIG. 12A shows the result of the measured frequency characteristic including the head amplifier, wires, and magnetic recording head. Graph 601 in FIG. 13 shows the result of the measured frequency characteristic of the head portion. From the fact that the frequency characteristic of the current value in graph 502 in FIG. 12B is the electrical frequency characteristic of the head amplifier equivalent circuit 102 and wires, a combination of the frequency characteristic in graph 601 in FIG. 13 and that in graph 502 in FIG. 12B is expected to be equal to the characteristic in graph 501 in FIG. 12A. Graph 701 in FIG. 14 shows the result of multiplying the frequency characteristic in graph 601 in FIG. 13 by the frequency characteristic in graph 502 in FIG. 12B. The frequency characteristic of graph 701 in FIG. 9 is almost equal to the frequency characteristic in graph 501 in FIG. 12A. This proves that, in the measuring method of the third embodiment, the frequency dependence can be measured in such a manner that it is separated into the magnetic characteristic (graph 601 in FIG. 13) and the electrical characteristic (graph 501 in FIG. 12B) and that the head magnetic field frequency dependence (graph 501 in FIG. 12A), a combination of the magnetic characteristic and the electrical characteristic, in a state similar to an HDD-situ condition can be measured.

Figure 15:
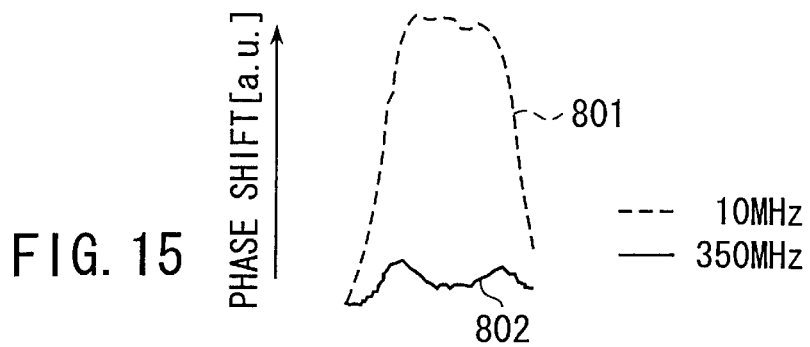
FIG. 15 shows profiles corresponding to the result at the edge portion of the PI magnetic pole at the gap in the magnetic recording head in FIG. 11 using the method in FIG. 9.

FIG. 15 shows profiles corresponding to the result at the edge portion 404 of the PI magnetic pole 401 at the gap in the magnetic recording head in FIG. 11 using the method in FIG. 9. The dotted line 801 and solid line 802 represent the results at frequencies of 10 MHz and 350 MHz, respectively. When the frequency is 350 MHz, the intensity of the magnetic field decreases as shown by the dependence in graph 501. Not only does the magnetic field decrease, but also a peak appears at the edge corner and the contrast changes. The reason is that as the frequency increases, the magnetic field intensity in the central portion decreases because of the skin effect. In this way, the characteristic of the magnetic recording head at any frequency can be measured with a high resolution and changes in the contrast or the intensity caused by the difference between frequencies can be analyzed.

With the third embodiment, the frequency characteristic of the magnetic field generated from the magnetic recording head can be measured in an environment almost the same as the state where the magnetic recording head is incorporated in an HDD.

Furthermore, the frequency characteristic of the magnetic recording head portion (eliminating the influence of the wires and head amplifier) can be measured.

Moreover, the frequency characteristic of the magnetic recording head can be measured in such a manner that it is separated into the electrical characteristic and the magnetic characteristic.

In addition, the characteristic of the magnetic recording head at any frequency can be measured with a high resolution and changes in the contrast or the intensity caused by the difference between frequencies can be analyzed.

Still furthermore, not only the gap position of the magnetic recording head but also the dependence on frequency of the magnetic field (leakage magnetic field) generated around the gap can be measured and the effect of the high-frequency leakage magnetic field on adjacent tracks can be estimated.

Additionally, the absolute value of the impedance can be measured at any frequency from the applied voltages and measured current values of the signal generators.

Still furthermore, not only can the obtained data be stored by the signal processing unit, but also the magnetic recording head characteristic evaluating unit including the force measuring unit can be controlled and monitored. In addition, the measurement condition and measurement data of the magnetic recording head evaluating unit can be stored collectively and the analysis of the data can be made after experiments.

Fourth Embodiment

A fourth embodiment of the present invention will be explained.

(Configuration of Magnetic Recording Head)

The fourth embodiment measures the frequency characteristic similarly to the third embodiment (FIGS. 8 to 15). The fourth embodiment differs from the third embodiment in that it measures the frequency dependence of the current flowing through the magnetic recording head in advance, thereby enabling the frequency characteristic of the magnetic recording head to be obtained without incorporating a head amplifier equivalent circuit in the magnetic recording head characteristic evaluating unit.

For the measurement of the head current frequency dependence, it is possible to utilize the digital driving head amplifier actually used in measurement with an HDD, so that measurement can be made in a state similar to an HDD-situ condition.

When measurement is made with the head amplifier equivalent circuit incorporated in the magnetic recording head characteristic evaluating unit, it is desirable to cause a positive/negative high-frequency current (whose current value does zero-crossing and which has no offset current) to flow in order to make the measuring state closer to the state of an actual HDD. When a head amplifier equivalent circuit satisfying such a condition is constructed, it is difficult to widen the band. On the other hand, in a state including an offset current, it is relatively easy for the head amplifier equivalent circuit to widen the band. In this case, however, since an offset magnetic field is generated at the magnetic recording head and the magnetic field gets saturated in part of the magnetic recording head, it is difficult to measure the high-frequency magnetic field by using MFM. To overcome this difficulty, the head current frequency dependence is measured in advance using a head amplifier equivalent circuit having an offset current and measurement is made by a method explained below, enabling measurement to be made in a very high-frequency band.

Figure 16A:
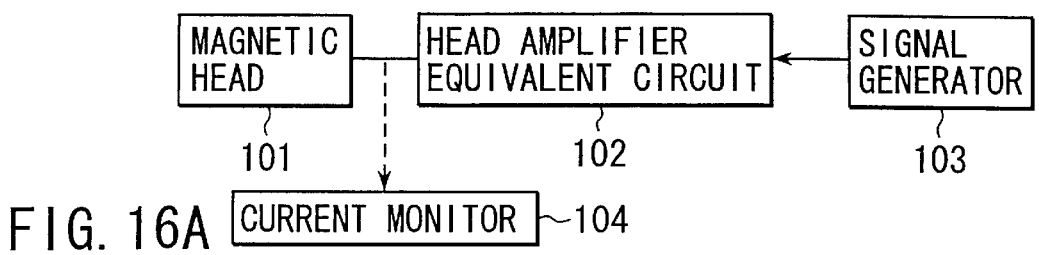
FIGS. 16A and 16B shows a circuit configuration of a device for measuring the head current frequency dependence in advance according to a fourth embodiment of the present invention, and a graph of the measured head current frequency dependence.
Figure 16B:
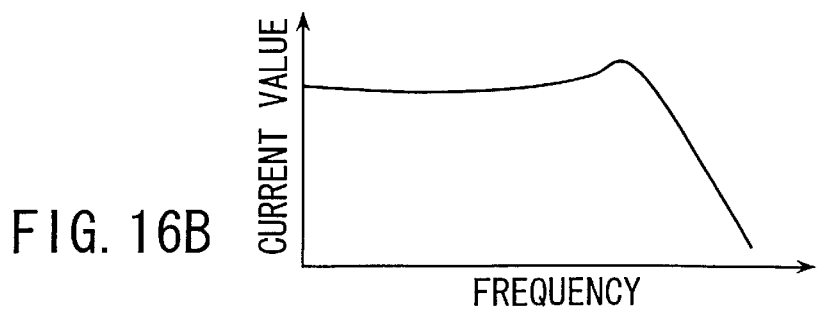

FIG. 16A shows a circuit configuration of a device for measuring the head current frequency dependence in advance. The device of FIG. 16A is composed of the same component parts as the magnetic recording head 101, head amplifier equivalent 102, signal generator 103, and current monitor 104 in FIG. 8. Since the individual component parts are the same as described earlier, a concrete explanation will be omitted. FIG. 16B is a graph showing the head current frequency dependence obtained in measurement using the device of FIG. 16A.

Figure 17:
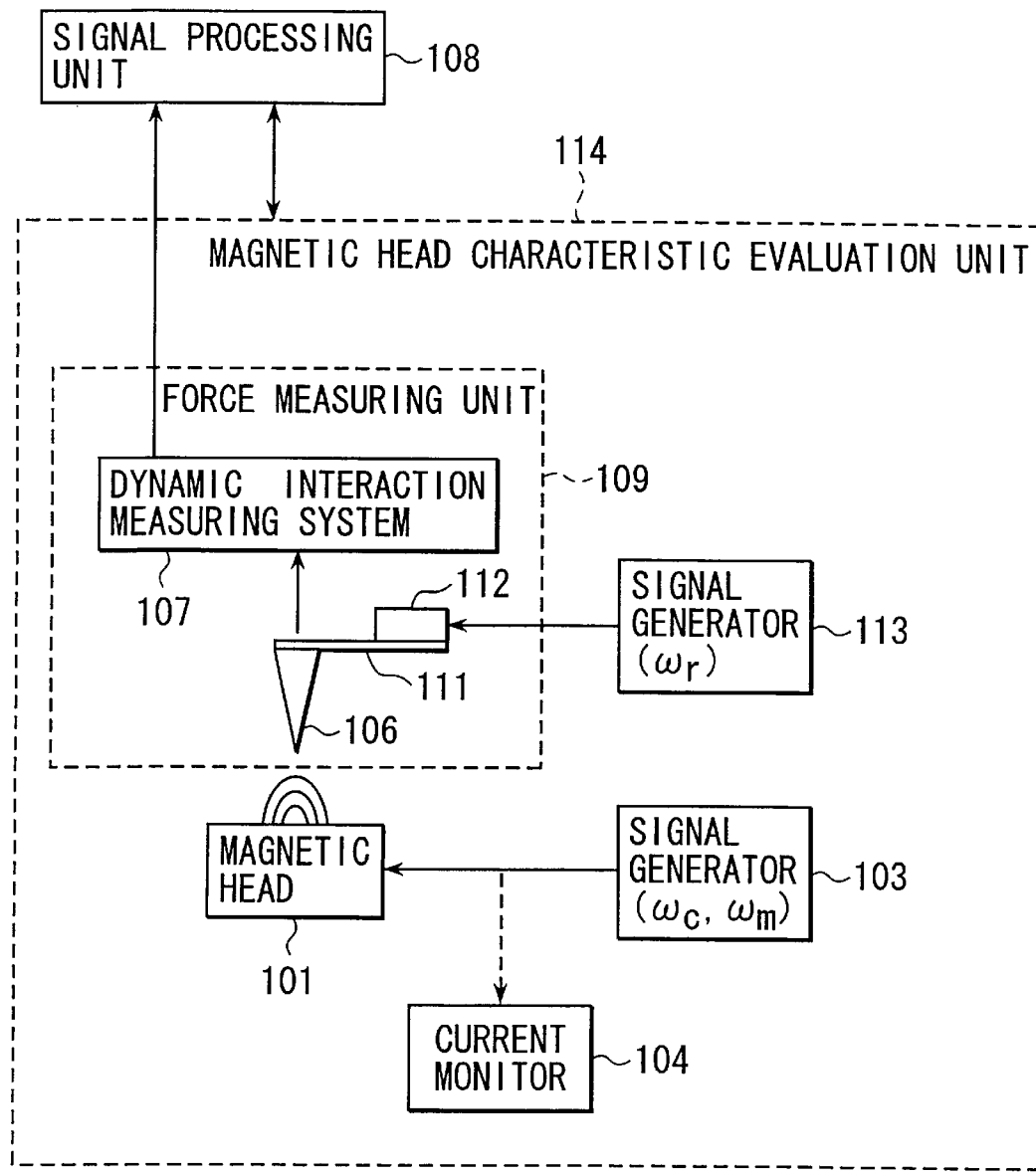
FIG. 17 is a block diagram showing the main part of a magnetic recording head measuring apparatus according to the fourth embodiment.

FIG. 17 is a block diagram showing the main part of the magnetic recording head measuring apparatus according to the fourth embodiment. The measuring apparatus is used to measure the head magnetic field frequency dependence concerning the magnetic force interaction caused by the high-frequency magnetic field after the device of FIG. 16A measures the head current frequency dependence. In FIG. 17, the same parts as those in FIG. 8 are indicated by the same reference numerals and a concrete explanation will be omitted.

The head measuring apparatus of FIG. 17 differs from that of FIG. 8 in that it includes no head amplifier equivalent circuit and applies the signal generated from the signal generator 103 directly to the magnetic recording head 101. The remaining configuration is the same as that of the third embodiment.

(Measuring Method)

Hereinafter, the fourth embodiment will be explained by reference to FIGS. 16A to 17 and a flowchart in FIG. 18.

The head current frequency dependence is measured in advance using the device of FIG. 16A. Specifically, the frequency of the signal generator 103 is changed and the current value at the current monitor 104 is read and stored. As a result, the head current frequency dependence as shown in FIG. 16B is obtained.

Figure 18:
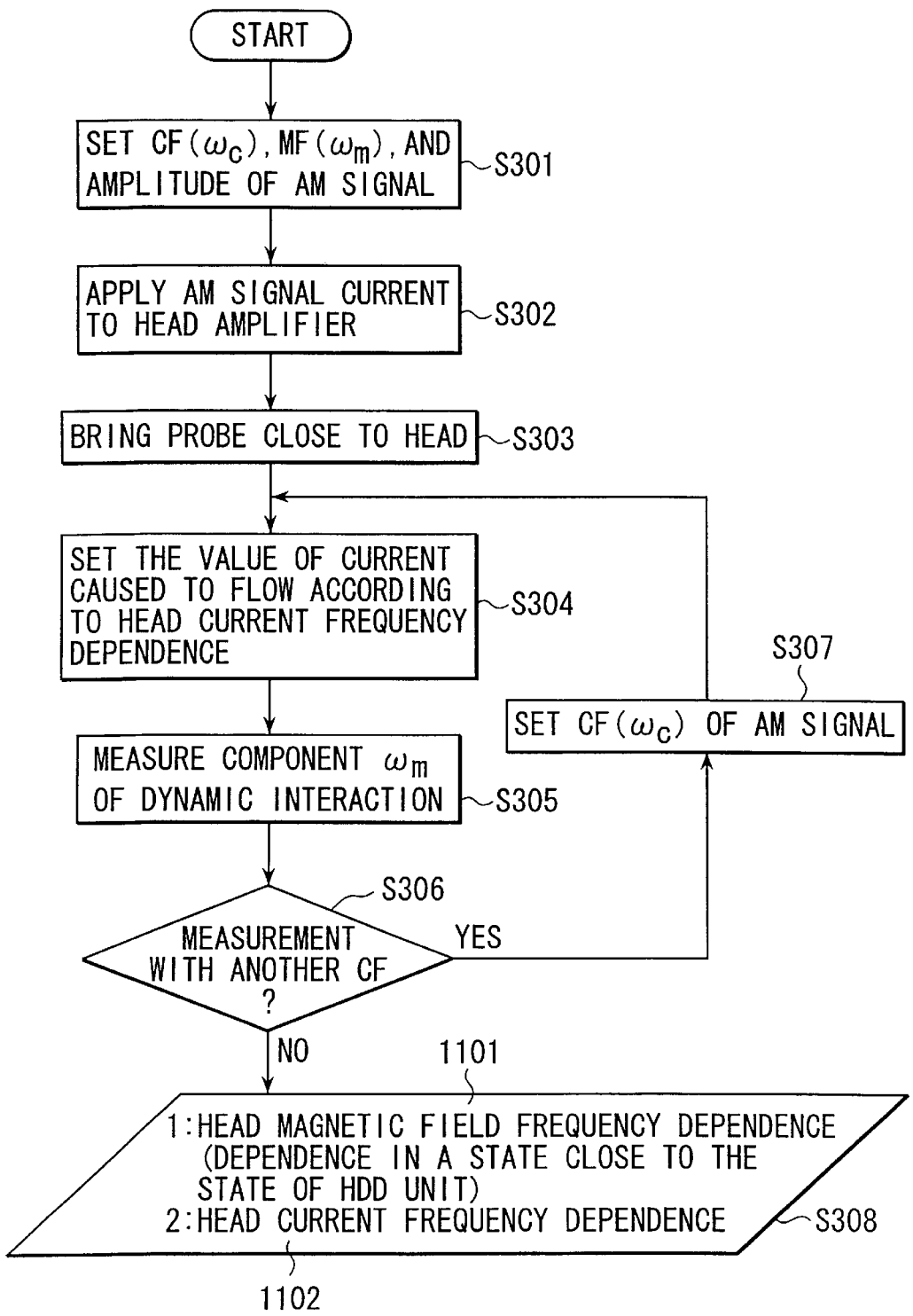
FIG. 18 is a flowchart to help explain a measuring method according to the fourth embodiment.

The frequency characteristic of the magnetic recording head in the fourth embodiment is measured according to the processes shown in FIGS. 18 and 10. In the processing of FIG. 18, (1) the head magnetic field frequency dependence of the cantilever phase shift (i.e., phase shift-frequency characteristic) in an environment similar to an HDD-situ condition and (2) the head current frequency dependence (i.e., current-frequency characteristic) concerning the value of current flowing through the magnetic recording head can be measured. On the other hand, in the processing of FIG. 10, (3) the head magnetic field frequency dependence (i.e., phase shift-frequency characteristic) concerning the magnetic recording head portion (mainly related to the magnetic material) can be measured.

In FIG. 18, the magnetic recording head 101 to be measured is placed in a specific measuring position. The carrier frequency CF ($\omega c$), modulation frequency MF ($\omega m$), and amplitude of the amplitude modulation signal at the signal generator 103 are set (step S301). Here, the modulation frequency MF ($\omega m$) is set lower than the resonance frequency $\omega r$ of the cantilever 111. The amplitude modulation signal output from the signal generator 103 is applied to the magnetic recording head 101 (step S302), causing the magnetic recording head 101 to generate a magnetic field. The probe 106 is brought close to the magnetic recording head (step S303), making it possible to measure the dynamic interaction caused by the head magnetic field. The value of the current flowing through the magnetic recording head 101 is measured with the current monitor 104 and the output of the signal generator 103 is adjusted so that a current with a predetermine value may flow (step S304). Then, the $\omega m$ component of the force interaction acting on the probe 106 is measured (S305). The measurement in step S305 is made in one of the following two cases: (1) one case where the probe 106 is brought close to the magnetic recording head 101 and measurement is made at one point without the scanning of the probe 106 and (2) the other case where the probe 106 is caused to scan so as to measure the one-dimensional profile or two-dimensional image, then an arbitrary point is selected, and the $\omega m$ component at that position is set as the measured value. When measurement is made with another carrier frequency CF ($\omega c$), the carrier frequency CF of the amplitude modulation signal of the signal generator 103 is set (step S307) and the measurements at steps S304 and S305 are repeated. From the results at the individual frequencies, the following are obtained: (1) the head magnetic field frequency dependence 1101 in a state similar to an HDD-situ condition and (2) the head current frequency dependence 1102 concerning the value of current flowing through the magnetic recording head (step S308).

Then, measurement is made according to the flowchart of FIG. 10 as described earlier. At this time, even if the head amplifier equivalent circuit is not incorporated in the magnetic recording head characteristic evaluating unit 114, a similar measurement can be made.

The fourth embodiment produces not only the same effect as that of the third embodiment but also the effect of being capable of measuring the frequency characteristic and the like of the magnetic recording head without providing a head amplifier equivalent circuit in the magnetic recording head characteristic evaluating unit by measuring the head current frequency dependence concerning the value of current flowing through the recording head before incorporating the magnetic recording head in the magnetic recording head characteristic evaluating unit.

As has been explained in detail, with the present invention represented by the third and fourth embodiments, it is possible to measure the frequency characteristic of the magnetic field generated from the magnetic recording head in an environment almost equal to the state where the magnetic recording head is incorporated in an HDD.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A high-frequency characteristic measuring apparatus comprising:
    a probe measuring a high-frequency characteristic of a surface of a specimen;
    a vibrator vibrating the probe at a constant amplitude in a direction normal to the surface of the specimen;
    a controller controlling a relative position between the probe and the surface of the specimen to scan the surface of the specimen;
    a driver generating an excitation field, which is amplitude-modulated at a predetermined carrier frequency and a modulation frequency, at the surface of the specimen; and
    a detector detecting a signal corresponding to the excitation field generated at the surface of the specimen by the driver, as a phase shift between vibration of the probe and that of the vibrator,
    wherein the modulation frequency is less than the frequency at which the probe is vibrated.

2. The apparatus according to claim 1, further comprising a synchronous detector measuring a component of the signal detected as the phase shift, which is synchronous with a frequency which is once or twice as high as the modulation frequency.

3. The apparatus according to claim 1, wherein the probe includes a conductor.

4. The apparatus according to claim 1, wherein the probe includes a conductive semiconductor.

5. The apparatus according to claim 1, wherein the probe includes a magnetic substance.

6. The apparatus according to claim 1, wherein the driver includes a generator generating a magnetic field which is modulated at the predetermined carrier frequency and the modulation frequency.

7. A measuring apparatus comprising:
    a probe having a magnetic substance measuring a high-frequency characteristic of a surface of a specimen;
    a vibrator vibrating the probe at a constant amplitude and at a resonance frequency of the probe or a frequency close to the resonance frequency in a direction normal to the surface of the specimen;

a controller controlling a relative position between the probe and the surface of the specimen to scan the surface of the specimen;

a driver generating an excitation magnetic field, which is amplitude-modulated at a predetermined carrier frequency and a modulation frequency, at the surface of the specimen;

a first detector detecting a signal corresponding to the excitation field generated at the surface of the specimen by the driver, as a phase shift between vibration of the probe and that of the vibrator; and a second detector measuring a component of the signal detected as the phase shift, which is synchronous with a frequency which is once or twice as high as the modulation frequency;

wherein the modulation frequency is less than the frequency at which the probe is vibrated.

8. A high-frequency characteristic measuring apparatus comprising:

a probe measuring a high-frequency characteristic of a surface of a specimen;

a vibrator vibrating the probe at a constant amplitude in a direction normal to the surface of the specimen;

a controller controlling a relative position between the probe and the surface of the specimen to scan the surface of the specimen;

a driver generating an excitation field, which is amplitude-modulated at a predetermined carrier frequency and a modulation frequency, at the surface of the specimen; and a detector detecting a signal corresponding to the excitation field generated at the surface of the specimen by the driver, as a frequency shift of vibration of the probe, wherein the modulation frequency is less than the frequency at which the probe is vibrated.

9. The apparatus according to claim 8, further comprising a synchronous detector measuring a component of the signal detected as the frequency shift, which is synchronous with a frequency which is once or twice as high as the modulation frequency.

10. The apparatus according to claim 8, wherein the first detector, the vibrator, and the probe constitute a feedback control system in which the probe is appropriately vibrated in accordance with the signal detected as the frequency shift.

11. The apparatus according to claim 8, wherein the probe includes a conductor.

12. The apparatus according to claim 8, wherein the probe includes a conductive semiconductor.

13. The apparatus according to claim 8, wherein the probe includes a magnetic substance.

14. The apparatus according to claim 9, wherein the driver includes a generator generating a magnetic field which is modulated at the predetermined carrier frequency and the modulation frequency.

15. A measuring apparatus comprising:

a probe having a magnetic substance measuring a high-frequency characteristic of a surface of a specimen;

a vibrator vibrating the probe at a constant amplitude in a direction normal to the surface of the specimen;

a controller controlling a relative position between the probe and the surface of the specimen to scan the surface of the specimen;

a driver generating an excitation magnetic field, which is amplitude-modulated at a predetermined carrier frequency and a modulation frequency, at the surface of the specimen;

a first detector detecting a signal corresponding to the excitation field generated at the surface of the specimen by the driver, as a frequency shift of vibration of the probe; and a second detector measuring a component of the signal detected as the frequency shift, which is synchronous with a frequency which is once or twice as high as the modulation frequency;

wherein the modulation frequency is less than the frequency at which the probe is vibrated.

16. The apparatus according to claim 15, wherein the first detector, the vibrator, and the probe constitute a feedback control system in which the probe is appropriately vibrated in accordance with the signal detected as the frequency shift.

17. A magnetic recording head measuring apparatus using a magnetic-force microscope, the apparatus comprising:

a generator applying an amplitude-modulated signal current to a specimen to be measured, which is a magnetic recording head, such that an amplitude-modulated magnetic field is generated from the specimen;

a probe mounted on a cantilever which is vibrated at a constant amplitude, the probe being operated above a surface of the magnetic recording head without contacting the surface thereof;

a detector selectively measuring one of a force gradient and a force induced to the probe by the magnetic field from the specimen, wherein the detector includes:

a phase detector detecting a phase shift in vibration of the cantilever in accordance with displacement of the cantilever; and a force gradient detector measuring the force gradient from the phase shift.

18. A measuring method for use in a magnetic recording head measuring apparatus using a magnetic-force microscope, comprising the steps of:

generating an amplitude modulation signal, in which a predetermined side wave band frequency and a carrier frequency are set, to a specimen to be measured which is a magnetic recording head, and applying a signal current to the specimen, the signal current being amplitude-modulated by the amplitude modulation signal;

moving a probe mounted on a cantilever to the vicinity of the specimen, the probe being designed to detect a magnetic force depending on an amplitude-modulated magnetic field generated from the specimen, without contacting the specimen, the cantilever being vibrated at a constant amplitude;

detecting displacement of the cantilever;

outputting measurement signals associated with a force gradient and a force acting on the probe, based on a result of detection in the displacement detecting step;

and selectively inputting the measurement signals, and measuring one of the force gradient and the force acting the probe, based on distribution of a high-frequency magnetic field generated from the specimen.

19. A magnetic recording head measuring apparatus for measuring a characteristic of a magnetic recording head, comprising:

a probe which is operated above a surface of the magnetic recording head without contacting the surface thereof;

a vibrator vibrating the probe;

a signal generator generating an amplitude modulation signal based on a carrier frequency, and changing a value of the amplitude modulation signal by changing the carrier frequency;

a head amplifier equivalent circuit having an electrical characteristic equivalent to that of an actual head driving amplifier, generating an amplitude modulation current for use in operating the magnetic recording head based on the amplitude modulation signal, and applying the amplitude modulation current to the magnetic recording head;

a phase sensitive detector measuring a phase shift in vibration of the probe which depends on a magnetic field generated from the magnetic recording head; and a magnetic-field frequency dependence detector measuring a change of the phase shift with respect to a change of the value of the amplitude modulation signal which is generated by the signal generator, as magnetic-field frequency dependence of the magnetic recording head.

20. The apparatus according to claim 19, further comprising:

a current detector measuring a value of the amplitude modulation current applied to the magnetic recording head; and a current frequency dependence detector measuring a change of the value of the amplitude modulation current with respect to a change of the value of the amplitude modulation signal which is generated by the signal generator, as frequency dependence of the amplitude modulation current of the magnetic recording head.

21. The apparatus according to claim 19, comprising:

an amplitude controller controlling the signal generator to change an amplitude of the amplitude modulation signal such that the value of the amplitude modulation current is equal to a reference value; and a detector measuring a change of a value of a signal acting on the probe due to the magnetic field with respect to a change of the value of the carrier frequency.

22. A magnetic recording head measuring apparatus for measuring a characteristic of a magnetic recording head, comprising:

a current frequency dependence detector measuring frequency dependence of the current applied to the magnetic recording head by using a head amplifier equivalent circuit having an electrical characteristic equivalent to that of an actual head driving amplifier a probe which is operated above a surface of the magnetic recording head without contacting the surface thereof;

a vibrator vibrating the probe;

a signal generator generating an amplitude modulation signal based on a carrier frequency and a modulation frequency, applying the amplitude modulation signal to the magnetic recording head as an amplitude modulation current for use in operating the magnetic recording head, and changing a value of the amplitude modulation signal by changing the carrier frequency;

a phase sensitive detector measuring a phase shift in vibration of the probe which depends on a magnetic filed generated from the magnetic recording head; and a magnetic field frequency dependency detector measuring a change of the phase shift with respect to a change of the value of the amplitude modulation signal which is generated by the signal generator, as frequency dependence of the magnetic field applied to the magnetic recording head.

23. A magnetic recording head measuring method for measuring a characteristic of a magnetic recording head, comprising the steps of:

scanning a surface of the magnetic recording head, with a probe vibrated without contacting the surface of the magnetic recording head;

generating an amplitude modulation signal based on a carrier frequency and a modulation frequency, and changing a value of the amplitude modulation signal by changing the carrier frequency;

applying the amplitude modulation signal to a head amplifier equivalent circuit having an electrical characteristic equivalent to that of an actual head driving amplifier;

generating an amplitude modulation current for use in operating the magnetic recording head with the head amplifier equivalent circuit, and applying the amplitude modulation current from the head amplifier equivalent circuit to the magnetic recording head;

measuring a phase shift in vibration of the probe which depends on a magnetic field generated from the magnetic recording head; and measuring a change of the phase shift with respect to a change of a value of the amplitude modulation signal, as frequency dependence of the magnetic field applied to the magnetic recording head.

24. The method according to claim 23, comprising the steps of:

measuring a value of the amplitude modulation current applied from the head amplifier equivalent circuit to the magnetic recording head; and measuring a change of the value of the magnetic modulation current with respect to a change of the value of the amplitude modulation signal, as frequency dependence of the amplitude modulation current of the magnetic recording head.

25. The method according to claim 23, further comprising the steps of:

changing an amplitude of the amplitude modulation signal such that a value of the amplitude modulation current is equal to a reference value; and measuring a value of the modulation frequency with respect to a change of the value of the amplitude modulation signal, as frequency dependence of the magnetic field applied to the magnetic recording head.

26. A magnetic recording head measuring method for measuring a characteristic of a magnetic recording head, comprising the steps of:

measuring frequency dependence of an amplitude modulation current of the magnetic recording head by using a head amplifier equivalent circuit having an electrical characteristic equivalent to that of an actual head driving amplifier;

scanning a surface of the magnetic recording head, with the probe vibrated without contacting the surface of the magnetic recording head;

generating an amplitude modulation signal based on a carrier frequency and a modulation frequency, applying the amplitude modulation signal to the magnetic recording head as an amplitude modulation current for use in operating the magnetic recording head, and changing a value of the amplitude modulation signal by changing the carrier frequency;

measuring a phase shift in vibration of the probe which depends on a magnetic field generated from the magnetic recording head; and measuring a change of the phase shift with respect to a change of the value of the amplitude modulation signal, as frequency dependence of the magnetic field applied to the magnetic recording head.

* * * * *